US012185284B2

(12) United States Patent
Chen et al.

(10) Patent No.: US 12,185,284 B2
(45) Date of Patent: *Dec. 31, 2024

(54) TECHNIQUES FOR UNLINKING PHYSICAL DOWNLINK CONTROL CHANNEL (PDCCH) CANDIDATES DUE TO PDCCH CANDIDATE DROPPING IN DEPLOYMENTS FEATURING PDCCH REPETITION

(71) Applicant: QUALCOMM Incorporated, San Diego, CA (US)

(72) Inventors: Yitao Chen, San Diego, CA (US); Mostafa Khoshnevisan, San Diego, CA (US); Jing Sun, San Diego, CA (US); Xiaoxia Zhang, San Diego, CA (US); Tao Luo, San Diego, CA (US); Wooseok Nam, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,814

(22) Filed: Jul. 7, 2023

(65) Prior Publication Data

US 2023/0388974 A1 Nov. 30, 2023

Related U.S. Application Data

(63) Continuation of application No. 17/213,165, filed on Mar. 25, 2021, now Pat. No. 11,743,864.

(51) Int. Cl.
*H04W 72/02* (2009.01)
*H04W 24/08* (2009.01)
(Continued)

(52) U.S. Cl.
CPC .......... *H04W 72/02* (2013.01); *H04W 24/08* (2013.01); *H04W 72/0446* (2013.01);
(Continued)

(58) Field of Classification Search
CPC ... H04W 72/08; H04W 72/02; H04W 72/085; H04W 24/08; H04W 72/044; H04W 72/1278; H04W 72/082
See application file for complete search history.

(56) References Cited

U.S. PATENT DOCUMENTS

2014/0185508 A1\* 7/2014 Suda ...................... H04W 48/16
370/311
2017/0055249 A1\* 2/2017 Yasukawa ............. H04W 72/23
(Continued)

OTHER PUBLICATIONS

International Search Report and Written Opinion—PCT/US2022/017631—ISA/EPO—Jul. 25, 2022.
(Continued)

*Primary Examiner* — Romani Ohri
(74) *Attorney, Agent, or Firm* — Arun Swain

(57) ABSTRACT

This disclosure provides systems, methods and apparatus, including computer programs encoded on computer storage media, for maintaining, between a user equipment (UE) and a component of a base station (BS), a mutual understanding of a set of linked physical downlink control channel (PDCCH) candidates if the UE selects to monitor a subset of the linked PDCCH candidates. In one aspect, the UE may monitor the subset of the linked PDCCH candidates, and the UE and the component of the BS may select a reference PDCCH candidate from which to define scheduling information in accordance with the UE monitoring the subset of the linked PDCCH candidates. In some examples, the UE and the component of the BS may select the reference PDCCH candidate in accordance with one or more mutually
(Continued)

understood rules or procedures such that the UE and the component of the BS may select a same reference PDCCH candidate.

18 Claims, 19 Drawing Sheets

(51) Int. Cl.
| | |
|---|---|
| *H04W 72/04* | (2023.01) |
| *H04W 72/0446* | (2023.01) |
| *H04W 72/0453* | (2023.01) |
| *H04W 72/12* | (2023.01) |
| *H04W 72/1273* | (2023.01) |
| *H04W 72/23* | (2023.01) |
| *H04W 72/50* | (2023.01) |
| *H04W 72/566* | (2023.01) |

(52) U.S. Cl.
CPC ... *H04W 72/0453* (2013.01); *H04W 72/1273* (2013.01); *H04W 72/23* (2023.01); *H04W 72/535* (2023.01); *H04W 72/566* (2023.01)

(56) References Cited

U.S. PATENT DOCUMENTS

| | | | |
|---|---|---|---|
| 2021/0007050 A1* | 1/2021 | Lin | H04W 72/23 |
| 2021/0282123 A1* | 9/2021 | Wong | H04W 72/23 |
| 2021/0314955 A1* | 10/2021 | Zhang | H04W 72/02 |
| 2022/0232522 A1* | 7/2022 | Reial | H04W 72/23 |
| 2022/0312380 A1 | 9/2022 | Chen | |

OTHER PUBLICATIONS

Moderator (QUALCOMM): "Discussion Summary for mTRP PDCCH Reliability Enhancements", 3GPP TSG-RAN WG1 Meeting #104-e, 3GPP Draft, R1-2101838, 3rd Generation Partnership Project (3GPP), Mobile Competence Centre, .650, Route Des Lucioles, F-06921 Sophia-Antipolis Cedex, France, vol. RAN WG1, No. e-Meeting, Jan. 25, 2021-Feb. 5, 2021, Jan. 29, 2021 (Jan. 29, 2021), 49 Pages, XP051975934, sections 1, 2.1, 2.3.1, 2.4.1, 2.5.3, 2.5.4, 3.

Moderator (QUALCOMM): "Summary #2 of Email Discussions [104-e-NR-feMIMO-02] for mTRP PDCCH Enhancements", 3GPP TSG-RAN WG1 Meeting #104-e, 3GPP Draft, R1-2101839, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 29, 2021 (Jan. 29, 2021), XP051975935, 25 Pages, section 6, sections 1, 3, 4, 5, 5.1.

Partial International Search Report—PCT/US2022/017631—ISA/EPO—Jun. 3, 2022.

* cited by examiner

TECHNIQUES FOR UNLINKING PHYSICAL DOWNLINK CONTROL CHANNEL (PDCCH) CANDIDATES DUE TO PDCCH CANDIDATE DROPPING IN DEPLOYMENTS FEATURING PDCCH REPETITION

CROSS REFERENCE

The present application for patent is a Continuation of U.S. patent application Ser. No. 17/213,165 by CHEN et al., entitled "TECHNIQUES FOR UNLINKING PHYSICAL DOWNLINK CONTROL CHANNEL (PDCCH) CANDIDATES DUE TO PDCCH CANDIDATE DROPPING IN DEPLOYMENTS FEATURING PDCCH REPETITION," filed Mar. 25, 2021, assigned to the assignee hereof, and expressly incorporated by reference in its entirety herein.

TECHNICAL FIELD

This disclosure relates to wireless communications, including techniques for unlinking physical downlink control channel (PDCCH) candidates due to PDCCH candidate dropping in deployments featuring PDCCH repetition.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

In some systems, a UE may monitor over a control channel, such as a physical downlink control channel (PDCCH), for control information from a BS. In some aspects, the UE may decode the control information and the UE and the BS may use the control information to support communication between the UE and the BS.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving an indication of a set of linked physical downlink control channel (PDCCH) candidates, the set of linked PDCCH candidates including a first PDCCH candidate and a second PDCCH candidate that are associated with a same PDCCH information, selecting the second PDCCH candidate for monitoring according to a resource conflict associated with the first PDCCH candidate, selecting one of the first PDCCH candidate or the second PDCCH candidate as a reference for the set of linked PDCCH candidates in connection with selecting the second PDCCH candidate for monitoring, and monitoring the second PDCCH candidate in accordance with the selected reference.

Another innovative aspect of the subject matter described in this disclosure can be implemented in an apparatus for wireless communications at a UE. The apparatus may include a first interface, a second interface, and a processing system. The first interface may be configured to receive an indication of a set of linked PDCCH candidates, the set of linked PDCCH candidates including a first PDCCH candidate and a second PDCCH candidate that are associated with a same PDCCH information. The processing system may be configured to select the second PDCCH candidate for monitoring according to a resource conflict associated with the first PDCCH candidate. The processing system may be further configured to select one of the first PDCCH candidate or the second PDCCH candidate as a reference for the set of linked PDCCH candidates in connection with selecting the second PDCCH candidate for monitoring and monitor the second PDCCH candidate in accordance with the selected reference.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to receive an indication of a set of linked PDCCH candidates, the set of linked PDCCH candidates including a first PDCCH candidate and a second PDCCH candidate that are associated with a same PDCCH information, select the second PDCCH candidate for monitoring according to a resource conflict associated with the first PDCCH candidate, select one of the first PDCCH candidate or the second PDCCH candidate as a reference for the set of linked PDCCH candidates in connection with selecting the second PDCCH candidate for monitoring, and monitor the second PDCCH candidate in accordance with the selected reference.

Another innovative aspect of the subject matter described in this disclosure can be implemented in another apparatus for wireless communications at a UE. The apparatus may include means for receiving an indication of a set of linked PDCCH candidates, the set of linked PDCCH candidates including a first PDCCH candidate and a second PDCCH candidate that are associated with a same PDCCH information, means for selecting the second PDCCH candidate for monitoring according to a resource conflict associated with the first PDCCH candidate, means for selecting one of the first PDCCH candidate or the second PDCCH candidate as a reference for the set of linked PDCCH candidates in connection with selecting the second PDCCH candidate for monitoring, and means for monitoring the second PDCCH candidate in accordance with the selected reference.

Another innovative aspect of the subject matter described in this disclosure can be implemented in a non-transitory computer-readable medium storing code for wireless communications at a UE. The code may include instructions executable by a processor to receive an indication of a set of linked PDCCH candidates, the set of linked PDCCH candidates including a first PDCCH candidate and a second PDCCH candidate that are associated with a same PDCCH information, select the second PDCCH candidate for monitoring according to a resource conflict associated with the first PDCCH candidate, select one of the first PDCCH candidate or the second PDCCH candidate as a reference for the set of linked PDCCH candidates in connection with selecting the second PDCCH candidate for monitoring, and monitor the second PDCCH candidate in accordance with the selected reference.

Another innovative aspect of the subject matter described in this disclosure can be implemented in a method for wireless communications at a UE. The method may include receiving an indication of a set of linked PDCCH candidates, the set of linked PDCCH candidates including multiple PDCCH candidates that are associated with a same PDCCH information and selecting to monitor a first PDCCH candidate that is outside of the set of linked PDCCH candidates in accordance with a resource conflict between the first PDCCH candidate and a second PDCCH candidate that is within the set of linked PDCCH candidates, where the first PDCCH candidate is selected instead of an entirety of the set of linked PDCCH candidates.

Another innovative aspect of the subject matter described in this disclosure can be implemented in an apparatus for wireless communications at a UE. The apparatus may include a first interface, a second interface, and a processing system. The first interface may be configured to receive an indication of a set of linked PDCCH candidates, the set of linked PDCCH candidates including multiple PDCCH candidates that are associated with a same PDCCH information. The processing system may be configured to select to monitor a first PDCCH candidate that is outside of the set of linked PDCCH candidates in accordance with a resource conflict between the first PDCCH candidate and a second PDCCH candidate that is within the set of linked PDCCH candidates, where the first PDCCH candidate is selected instead of an entirety of the set of linked PDCCH candidates.

Another innovative aspect of the subject matter described in this disclosure can be implemented in another apparatus for wireless communications at a UE. The apparatus may include a processor, memory coupled with the processor, and instructions stored in the memory. The instructions may be executable by the processor to cause the apparatus to receive an indication of a set of linked PDCCH candidates, the set of linked PDCCH candidates including multiple PDCCH candidates that are associated with a same PDCCH information and select to monitor a first PDCCH candidate that is outside of the set of linked PDCCH candidates in accordance with a resource conflict between the first PDCCH candidate and a second PDCCH candidate that is within the set of linked PDCCH candidates, where the first PDCCH candidate is selected instead of an entirety of the set of linked PDCCH candidates.

Another innovative aspect of the subject matter described in this disclosure can be implemented in another apparatus for wireless communications at a UE. The apparatus may include means for receiving an indication of a set of linked PDCCH candidates, the set of linked PDCCH candidates including multiple PDCCH candidates that are associated with a same PDCCH information and means for selecting to monitor a first PDCCH candidate that is outside of the set of linked PDCCH candidates in accordance with a resource conflict between the first PDCCH candidate and a second PDCCH candidate that is within the set of linked PDCCH candidates, where the first PDCCH candidate is selected instead of an entirety of the set of linked PDCCH candidates.

Another innovative aspect of the subject matter described in this disclosure can be implemented in a non-transitory computer-readable medium storing code for wireless communications at a UE. The code may include instructions executable by a processor to receive an indication of a set of linked PDCCH candidates, the set of linked PDCCH candidates including multiple PDCCH candidates that are associated with a same PDCCH information and select to monitor a first PDCCH candidate that is outside of the set of linked PDCCH candidates in accordance with a resource conflict between the first PDCCH candidate and a second PDCCH candidate that is within the set of linked PDCCH candidates, where the first PDCCH candidate is selected instead of an entirety of the set of linked PDCCH candidates.

One innovative aspect of the subject matter described in this disclosure can be implemented in a method for wireless communications at a base station (BS). The method may include outputting an indication of a set of linked PDCCH candidates, the set of linked PDCCH candidates including a first PDCCH candidate and a second PDCCH candidate that are associated with a same PDCCH information, selecting the second PDCCH candidate as a monitored PDCCH candidate according to a resource conflict associated with the first PDCCH candidate, selecting one of the first PDCCH candidate or the second PDCCH candidate as a reference for the set of linked PDCCH candidates in connection with selecting the second PDCCH candidate as the monitored PDCCH candidate, and outputting the PDCCH information over the second PDCCH candidate in accordance with the selected reference.

Another innovative aspect of the subject matter described in this disclosure can be implemented in an apparatus for wireless communications at a BS. The apparatus may include a first interface, a second interface, and a processing system. The first interface may be configured to output an indication of a set of linked PDCCH candidates, the set of linked PDCCH candidates including a first PDCCH candidate and a second PDCCH candidate that are associated with a same PDCCH information. The processing system may be configured to select the second PDCCH candidate as a monitored PDCCH candidate according to a resource conflict associated with the first PDCCH candidate and to select one of the first PDCCH candidate or the second PDCCH candidate as a reference for the set of linked PDCCH candidates in connection with selecting the second PDCCH candidate as the monitored PDCCH candidate. The first interface or the second interface may be configured to output the PDCCH information over the second PDCCH candidate in accordance with the selected reference.

Another innovative aspect of the subject matter described in this disclosure can be implemented in another apparatus for wireless communications at a BS. The apparatus may include a processor, memory coupled with the processor, and instructions stored in the memory. The instructions may be executable by the processor to cause the apparatus to output an indication of a set of linked PDCCH candidates, the set of linked PDCCH candidates including a first PDCCH candidate and a second PDCCH candidate that are associated with a same PDCCH information, select the second PDCCH candidate as a monitored PDCCH candidate according to a resource conflict associated with the first PDCCH candidate, select one of the first PDCCH candidate or the second PDCCH candidate as a reference for the set of linked PDCCH candidates in connection with selecting the second PDCCH candidate as the monitored PDCCH candidate, and output the PDCCH information over the second PDCCH candidate in accordance with the selected reference.

Another innovative aspect of the subject matter described in this disclosure can be implemented in another apparatus for wireless communications at a BS. The apparatus may include means for outputting an indication of a set of linked PDCCH candidates, the set of linked PDCCH candidates including a first PDCCH candidate and a second PDCCH candidate that are associated with a same PDCCH information, means for selecting the second PDCCH candidate as a monitored PDCCH candidate according to a resource conflict associated with the first PDCCH candidate, means for selecting one of the first PDCCH candidate or the second PDCCH candidate as a reference for the set of linked PDCCH candidates in connection with selecting the second PDCCH candidate as the monitored PDCCH candidate, and means for outputting the PDCCH information over the second PDCCH candidate in accordance with the selected reference.

Another innovative aspect of the subject matter described in this disclosure can be implemented in a non-transitory computer-readable medium storing code for wireless communications at a BS. The code may include instructions executable by a processor to output an indication of a set of linked PDCCH candidates, the set of linked PDCCH candidates including a first PDCCH candidate and a second PDCCH candidate that are associated with a same PDCCH information, select the second PDCCH candidate as a monitored PDCCH candidate according to a resource conflict associated with the first PDCCH candidate, select one of the first PDCCH candidate or the second PDCCH candidate as a reference for the set of linked PDCCH candidates in connection with selecting the second PDCCH candidate as the monitored PDCCH candidate, and output the PDCCH information over the second PDCCH candidate in accordance with the selected reference.

Another innovative aspect of the subject matter described in this disclosure can be implemented in a method for wireless communications at a BS. The method may include outputting an indication of a set of linked PDCCH candidates, the set of linked PDCCH candidates including multiple PDCCH candidates that are associated with a same PDCCH information and selecting a first PDCCH candidate that is outside of the set of linked PDCCH candidates as a monitored PDCCH candidate in accordance with a resource conflict between the first PDCCH candidate and a second PDCCH candidate that is within the set of linked PDCCH candidates, where the first PDCCH candidate is selected as the monitored PDCCH candidate instead of an entirety of the set of linked PDCCH candidates.

Another innovative aspect of the subject matter described in this disclosure can be implemented in an apparatus for wireless communications at a BS. The apparatus may include a first interface, a second interface, and a processing system. The first interface may be configured to output an indication of a set of linked PDCCH candidates, the set of linked PDCCH candidates including multiple PDCCH candidates that are associated with a same PDCCH information. The processing system may be configured to select a first PDCCH candidate that is outside of the set of linked PDCCH candidates as a monitored PDCCH candidate in accordance with a resource conflict between the first PDCCH candidate and a second PDCCH candidate that is within the set of linked PDCCH candidates, where the first PDCCH candidate is selected as the monitored PDCCH candidate instead of an entirety of the set of linked PDCCH candidates.

Another innovative aspect of the subject matter described in this disclosure can be implemented in another apparatus for wireless communications at a BS. The apparatus may include a processor, memory coupled with the processor, and instructions stored in the memory. The instructions may be executable by the processor to cause the apparatus to output an indication of a set of linked PDCCH candidates, the set of linked PDCCH candidates including multiple PDCCH candidates that are associated with a same PDCCH information and select a first PDCCH candidate that is outside of the set of linked PDCCH candidates as a monitored PDCCH candidate in accordance with a resource conflict between the first PDCCH candidate and a second PDCCH candidate that is within the set of linked PDCCH candidates, where the first PDCCH candidate is selected as the monitored PDCCH candidate instead of an entirety of the set of linked PDCCH candidates.

Another innovative aspect of the subject matter described in this disclosure can be implemented in another apparatus for wireless communications at a BS. The apparatus may include means for outputting an indication of a set of linked PDCCH candidates, the set of linked PDCCH candidates including multiple PDCCH candidates that are associated with a same PDCCH information and means for selecting a first PDCCH candidate that is outside of the set of linked PDCCH candidates as a monitored PDCCH candidate in accordance with a resource conflict between the first PDCCH candidate and a second PDCCH candidate that is within the set of linked PDCCH candidates, where the first PDCCH candidate is selected as the monitored PDCCH candidate instead of an entirety of the set of linked PDCCH candidates.

Another innovative aspect of the subject matter described in this disclosure can be implemented in a non-transitory computer-readable medium storing code for wireless communications at a BS. The code may include instructions executable by a processor to output an indication of a set of linked PDCCH candidates, the set of linked PDCCH candidates including multiple PDCCH candidates that are associated with a same PDCCH information and select a first PDCCH candidate that is outside of the set of linked PDCCH candidates as a monitored PDCCH candidate in accordance with a resource conflict between the first PDCCH candidate and a second PDCCH candidate that is within the set of linked PDCCH candidates, where the first PDCCH candidate is selected as the monitored PDCCH candidate instead of an entirety of the set of linked PDCCH candidates.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
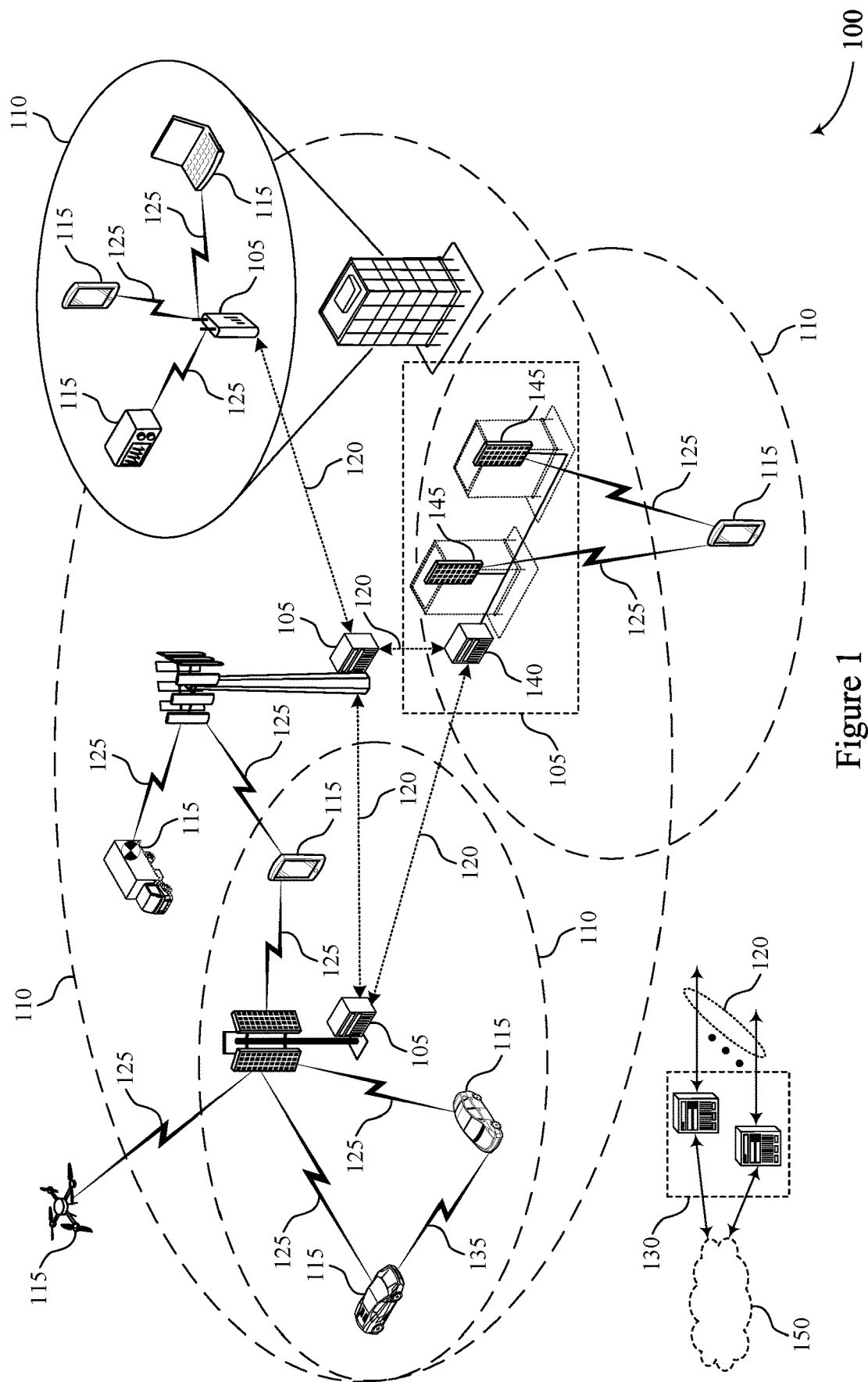
FIG. 1 illustrates an example of a wireless communications system that supports techniques for unlinking physical downlink control channel (PDCCH) candidates due to PDCCH candidate dropping in deployments featuring PDCCH repetition.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some systems, a base station (BS), or one or more components of a BS, may transmit downlink control information (DCI) to a user equipment (UE) over a downlink control channel, such as a physical downlink control channel (PDCCH), with repetition. For example, the BS, or one or more components of the BS, may transmit a same DCI over each of multiple PDCCH candidates that are linked for the repetition of the DCI. As such, the UE may monitor for the DCI over the multiple PDCCH candidates and, in some examples, may combine multiple received instances of the DCI prior to decoding (which may increase a likelihood for the UE to successfully decode the DCI). In such examples in which the UE receives multiple instances of the same DCI over the multiple PDCCH candidates, the UE and the BS may define a reference PDCCH candidate from which any scheduling information or scheduling restrictions obtained from the DCI are measured or defined.

In some examples, however, the UE may refrain from monitoring one or more PDCCH candidates of the multiple PDCCH candidates that are linked for the repetition of the DCI as a result of a resource conflict (for example, due to PDCCH overbooking or conflicting resource assignments, among other examples). Such a dropping of a PDCCH candidate from the multiple PDCCH candidates that are linked for repetition may result in ambiguity between the UE and the BS as to which PDCCH candidate is selected as the reference PDCCH candidate. For example, the UE and the BS may lack a well-defined procedure for defining whether or not the UE and the BS still consider the dropped PDCCH candidate as part of the multiple PDCCH candidates that are linked for repetition, which may potentially result in the UE and the BS operating in accordance with different communication timelines if the UE and the BS select different reference PDCCH candidates.

In some implementations of the present disclosure, the UE and the BS, or one or more components of the BS, may maintain a mutual understanding of the set of linked PDCCH candidates in connection with a reference PDCCH candidate selection rule that defines how the UE and the BS may update the set of linked PDCCH candidates or select a reference PDCCH candidate for the set of linked PDCCH candidates, or both, if the UE drops a PDCCH candidate of the set of linked PDCCH candidates. In some examples, for instance, if the UE selects to monitor a subset of the set of linked PDCCH candidates (such that the UE may drop or refrain from monitoring non-selected PDCCH candidates), the UE and the BS may update the set of linked PDCCH candidates to unlink the monitored PDCCH candidates from the unmonitored PDCCH candidates. In such examples, the UE and the BS may select the reference PDCCH candidate for the updated set of linked PDCCH candidates.

In some other examples in which the UE selects to monitor a subset of the set of linked PDCCH candidates, the UE and the BS may maintain the set of linked PDCCH candidates such that monitored PDCCH candidates and unmonitored PDCCH candidates of the set of linked PDCCH candidates remain linked. In such examples, the UE and the BS may select the reference PDCCH candidate for the set of linked PDCCH candidates (such that the UE and the BS may select an unmonitored PDCCH candidate or a monitored PDCCH candidate as the reference PDCCH candidate). In some other examples in which the UE selects to monitor a subset of the set of linked PDCCH candidates, the UE may refrain from monitoring any PDCCH candidate of the set of linked PDCCH candidates. In such examples, for instance, if the UE drops any one of the set of linked PDCCH candidates, the UE may drop a remainder of the set of linked PDCCH candidates and may instead monitor one or more PDCCH candidates outside of the set of linked PDCCH candidates.

Particular implementations of the subject matter described in this disclosure can be implemented to realize one or more of the following potential advantages. For example, the described techniques may be implemented to maintain synchronization and mutual understanding between the UE and the BS, or one or more components of the BS, with respect to which PDCCH candidate of the set of linked PDCCH candidates is the reference PDCCH candidate for the set. As such, the UE and the BS may communicate in accordance with a same communication timeline (as the UE and the BS may define any scheduling information associated with the DCI from the same reference PDCCH candidate), which may increase a likelihood for successful communication between the UE and the BS, or between the UE and one or more components of the BS. Accordingly, the UE and the BS may achieve increased system capacity, greater spectral efficiency, higher data rates, higher reliability, and lower latency, among other benefits.

FIG. 1 illustrates an example of a wireless communications system 100 that supports techniques for unlinking PDCCH candidates due to PDCCH candidate dropping in deployments featuring PDCCH repetition. The wireless communications system 100 may include one or more BSs 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (for example, mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or another interface). The BSs 105 may communicate with one another over the backhaul links 120 (for example, via an X2, Xn, or other interface) either directly (for example, directly between BSs 105), or indirectly (for example, via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some implementations (for example, in a carrier aggregation configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a BS 105, or downlink transmissions from a BS 105 to a UE 115. Carriers may carry downlink or uplink communications (for example, in an FDD mode) or may be configured to carry downlink and uplink communications (for example, in a TDD mode).

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (for example, a duration of one modulation symbol) and one subcarrier, where the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and N f may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some implementations, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some implementations, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (for example, over a carrier) and may be associated with an identifier for distinguishing neighboring cells (for example, a physical cell identifier (PCID), a virtual cell identifier (VCID), or others). In some implementations, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the BS 105. For example, a cell may be or include a building, a subset of a building, or exterior spaces between or overlapping with geographic coverage areas 110, among other implementations.

A macro cell generally covers a relatively large geographic area (for example, several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A BS 105 may support one or multiple cells and also may support communications over the one or more cells using one or multiple component carriers.

In some implementations, a carrier may support multiple cells, and different cells may be configured according to different protocol types (for example, MTC, narrowband IoT (NB-IoT), enhanced mobile broadband (eMBB)) that may provide access for different types of devices.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a BS 105 without human intervention. In some implementations, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some implementations, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RB s)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1-M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

In some implementations, the D2D communication link 135 may be an example of a communication channel, such as a sidelink communication channel, between vehicles (for example, UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (for example, BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BS s 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (for example, by a transmitting device, such as a BS 105, or by a receiving device, such as a UE 115) a beam direction for later transmission or reception by the BS 105.

Some signals, such as data signals associated with a particular receiving device, may be transmitted by a BS 105 in a single beam direction (for example, a direction associated with the receiving device, such as a UE 115). In some implementations, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some implementations, transmissions by a device (for example, by a BS 105 or a UE 115) may be performed using multiple beam directions, and the device may use a combination of digital precoding or radio frequency beamforming to generate a combined beam for transmission (for example, from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (for example, a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

The UEs 115 and the BS s 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

In some implementations, a UE 115 and a BS 105, or one or more components of the BS 105, may support PDCCH repetition such that the BS 105 may transmit multiple instances of a same control information (such as a same DCI or a same PDCCH information) over multiple PDCCH candidates. A PDCCH candidate may refer to a resource location (for example, a time and frequency resource location) over which the BS 105 may transmit control information to the UE 115 and, in some examples, the BS 105 may "link" multiple PDCCH candidates together to indicate, to the UE 115, that the linked PDCCH candidates carry repeats of the same control information. Accordingly, the UE 115 may monitor for the linked PDCCH candidates to receive the control information from the BS 105. In some implementations, the BS 105 may link PDCCH candidates of different search space (SS) sets or of different monitoring occasions as a result of a linking of the different SS sets or the different monitoring occasions (for example, if two SS sets or two monitoring occasions are linked, PDCCH candidates within such two linked SS sets or such two linked monitoring occasions also may be linked).

In some implementations, however, the UE 115 may select to monitor a subset of the linked PDCCH candidates. For instance, in examples in which the linked PDCCH candidates includes a first PDCCH candidate and a second PDCCH candidate, the UE 115 may, in some implementations, select to monitor the second PDCCH candidate (and to drop the first PDCCH candidate from a set of monitored PDCCH candidates) as a result of or according to a resource conflict associated with the first PDCCH candidate. In such implementations in which the UE 115 selects to monitor the second PDCCH candidate (and to drop the first PDCCH candidate), the UE 115 and the BS 105 may employ a mutually understood reference selection rule to select one of the first PDCCH candidate or the second PDCCH candidate as a reference (for example, a reference PDCCH candidate) for the linked PDCCH candidates.

In some implementations, for example, the selecting by the UE 115 to monitor for the second PDCCH candidate (and to drop the first PDCCH candidate) may trigger the UE 115 and the BS 105, or one or more components of the BS 105, to employ the reference selection rule. As a result of employing the reference selection rule, the UE 115 and the BS 105 may both select a same reference for the linked PDCCH candidates and may communicate with each other in accordance with a communication timeline that is defined as a function of a time domain property or a frequency domain property of the selected reference.

As described herein, a BS 105 may include components that are located at a single physical location or components located at various physical locations. In examples in which the BS 105 includes components that are located at various physical locations, the various components may each perform various functions such that, collectively, the various components may achieve functionality that is similar to a BS 105 that is located at a single physical location. As such, a BS 105 described herein may equivalently refer to a standalone BS 105 or a BS 105 including components that are located at various physical locations. In some implementations, such a BS 105 including components that are located at various physical locations may be referred to as or may be associated with a disaggregated radio access network (RAN) architecture, such as an Open RAN (O-RAN) or Virtualized RAN (VRAN) architecture.

Figure 2:
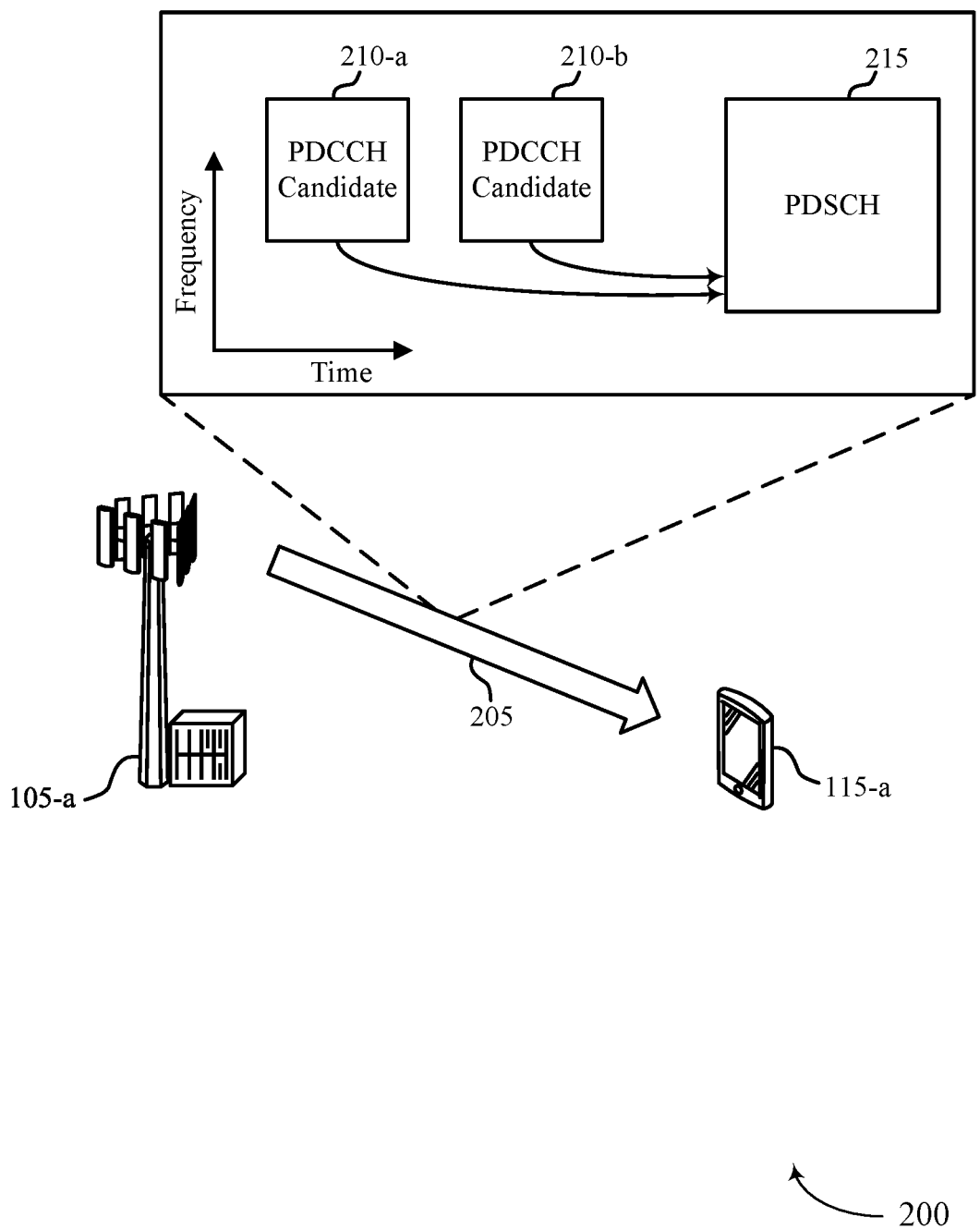
FIG. 2 illustrates an example signaling diagram that supports techniques for unlinking PDCCH candidates due to PDCCH candidate dropping in deployments featuring PDCCH repetition.

FIG. 2 illustrates an example signaling diagram 200 that supports techniques for unlinking PDCCH candidates due to PDCCH candidate dropping in deployments featuring PDCCH repetition. The signaling diagram 200 may implement or be implemented to realize aspects of the wireless communications system 100. For example, the signaling diagram 200 may include a UE 115-*a* and a BS 105-*a* (or one or more components of the BS 105-*a*), which may be examples of corresponding devices described herein, including with reference to FIG. 1. In some examples, the UE 115-*a* and the BS 105-*a* may employ techniques for maintaining a common understanding of a set of linked PDCCH candidates 210 and for selecting a reference PDCCH candidate for the set of linked PDCCH candidates 210 in examples in which the UE 115-a selects to monitor a subset of the set of linked PDCCH candidates 210.

For example, the UE 115-a and the BS 105-a may support PDCCH repetition and, as such, the BS 105-a may transmit a same DCI to the UE 115-a over two or more PDCCH candidates 210. In such examples, the BS 105-a may transmit the same DCI, which may include information relating to a physical downlink shared channel (PDSCH) transmission 215, over both a PDCCH candidate 210-a and a PDCCH candidate 210-b. In some aspects, the BS 105-a may explicitly link the PDCCH candidate 210-a with the PDCCH candidate 210-b (for example, the BS 105-a may transmit an indication of the linking of the PDCCH candidate 210-a and the PDCCH candidate 210-b to the UE 115-a) such that the UE 115-a may be aware of or otherwise recognize that the PDCCH candidate 210-a and the PDCCH candidate 210-b belong to a set of linked PDCCH candidates 210. As such, the UE 115-a may know or otherwise be aware of the linking of the PDCCH candidate 210-a and the PDCCH candidate 210-b before decoding the PDCCH candidates 210.

In some aspects, to convey the same DCI over the linked set of PDCCH candidates 210 (both the PDCCH candidate 210-a and the PDCCH candidate 210-b), the BS 105-a may repeat a same set of coded bits in each of the PDCCH candidate 210-a and the PDCCH candidate 210-b. Further, the BS 105-a may transmit each of the set of linked PDCCH candidates 210 (each repetition of the DCI) using a same number of control channel elements (CCEs). Accordingly, each linked PDCCH candidate 210 may correspond to a same DCI payload. Further, in some examples, the BS 105-a may link PDCCH candidates 210 in different SS sets (which may be associated with corresponding control resource sets (CORESETs)) for repetition and, in such examples, the PDCCH candidate 210-a and the PDCCH candidate 210-b may be located in different SS sets (and may correspond to or otherwise be associated with different CORESETs).

If the BS 105-a transmits a same DCI over the PDCCH candidate 210-a and the PDCCH candidate 210-b, the UE 115-a may decode the DCI in the PDCCH candidate 210-a, may decode the DCI in the PDCCH candidate 210-b, or may decode the DCI in both the PDCCH candidate 210-a and the PDCCH candidate 210-b. In examples in which the UE 115-a decodes the DCI carried by both the PDCCH candidate 210-a and the PDCCH candidate 210-b, the UE 115-a may, in some examples, employ a soft-combining technique as part of a decoding procedure for the DCI. For example, the UE 115-a may soft-combine the DCI received over the PDCCH candidate 210-a and the DCI received over the PDCCH candidate 210-b to obtain a combination of the two instances of the DCI and may decode the combination.

In some examples, such as in examples in which the UE 115-a incorrectly receives a portion of the DCI over the PDCCH candidate 210-a or the PDCCH candidate 210-b, or both, the UE 115-a may obtain a more complete or accurate version of the DCI as a result of employing the soft-combining technique. For instance, the UE 115-a may receive a first portion of the DCI over the PDCCH candidate 210-a and a second portion of the DCI over the PDCCH candidate 210-b (even though the BS 105-a may transmit the full DCI over both the PDCCH candidate 210-a and the PDCCH candidate 210-b), and may obtain a more complete version of the DCI as a result of combining the first portion and the second portion. Such a first portion of the DCI and a second portion of the DCI may include different information or may include at least partially overlapping information. The UE 115-a may decode the combination of the two instances of the DCI and, as such, may experience a greater likelihood for successfully decoding the DCI and receiving the PDSCH transmission 215.

In examples in which the UE 115-a and the BS 105-a employ PDCCH repetition, the UE 115-a may define any scheduling information or scheduling restrictions obtained from (or that are otherwise relevant to) the DCI based on a function of resources of the detected DCI. In other words, the scheduling information or scheduling restrictions associated with the DCI may be a function of a time domain property or a frequency domain property of the detected DCI. Such a detected DCI may refer to DCI that is actually decoded by the UE 115-a and, if the UE 115-a receives the DCI over multiple PDCCH candidates 210, the UE 115-a may select a PDCCH candidate from the PDCCH candidates 210 over which the UE 115-a monitors as a reference PDCCH candidate. Accordingly, the UE 115-a may use a time domain property or a frequency domain property of the selected reference PDCCH candidate to define the scheduling information or scheduling restrictions associated with the DCI.

Various procedures may rely on the selection of the reference PDCCH candidate and the use of the reference PDCCH candidate to define the scheduling information or scheduling restrictions associated with the DCI. For example, in a first procedure, the UE 115-a may use a starting CCE index and a quantity of CCEs in a CORESET of the reference PDCCH candidate to identify or otherwise determine a physical uplink control channel (PUCCH) resource for HARQ-ACK feedback if a corresponding PUCCH resource set has a size (a quantity of PUCCH resources within the PUCCH resource set) larger than eight. In some examples, for instance, the UE 115-a may identify or otherwise determine the PUCCH resource according to a PUCCH resource indicator (PRI) field of three bits (which may thus indicate or differentiate between up to eight PUCCH resources). As such, for a PUCCH resource set having a size larger than eight, the UE 115-a may use the starting CCE index and the number of CCEs in the CORSET of the reference PDCCH (or of a scheduling PDCCH in examples in which the BS 105-a transmits a single instance of the DCI) as supplementary "bits" or degrees of freedom to identify the PUCCH resource. In this first procedure, the UE 115-a may select the reference PDCCH candidate 210 in accordance with which of the monitored PDCCH candidates 210 has a lowest CORESET identifier (ID) or, if the monitored PDCCH candidates 210 have a same CORESET ID, in accordance with which of the monitored PDCCH candidates 210 has a lowest SS ID.

Additionally, or alternatively, in a second procedure, the UE 115-a may use a starting symbol of the reference PDCCH candidate to define in which symbols the UE 115-a expects to receive a PDSCH transmission, such as the PDSCH transmission 215, scheduled by the DCI carried by the linked PDCCH candidates 210. For example, if a PDSCH with mapping Type B is scheduled by DCI in PDCCH candidates 210 that are linked for repetition, the UE 115-a may not expect that a first (for example, initial) symbol of the PDSCH to start earlier than the starting symbol of the reference PDCCH candidate. In other words, if the UE 115-a receives a configuration of ReferenceofSLIV-ForDCIFormat1_2 and if the UE 115-a receives the PDSCH scheduled by a DCI format 1_2 with CRC scrambled by C-RNTI, MCS-C-RNTI, or CS-RNTI with K0=0, the UE 115-a and the BS 105-a may define a starting symbol S relative to the starting symbol S0 of the reference PDCCH candidate. In this second procedure, the UE 115-*a* may select the reference PDCCH candidate in accordance with which of the monitored PDCCH candidates 210 has a later (or latest) starting symbol relative to a remainder of the monitored PDCCH candidates 210.

Additionally, or alternatively, in a third procedure, the UE 115-*a* may define a scheduling offset and a quasi-colocation (QCL) timer relative to the reference PDCCH candidate and the UE 115-*a* may select a QCL assumption or relation for a scheduled PDSCH or CSI-RS in accordance with whether the scheduling offset is less than or greater than the QCL timer. Such use of the reference PDCCH candidate for selecting a QCL assumption for a scheduled PDSCH or CSI-RS is illustrated by and described in more detail with reference to FIG. 3. Additionally, or alternatively, in a fourth procedure, the UE 115-*a* may use a last symbol of the reference PDCCH candidate to define a physical uplink shared channel (PUSCH) processing timeline (which may be referred to as an N2 timeline) and a CSI computation timeline (which may be referred to as a Z timeline). In this fourth procedure, the UE 115-*a* may select the reference PDCCH candidate in accordance with which of the monitored PDCCH candidates 210 is a last PDCCH candidate 210 (for example, a last PDCCH repetition of the DCI).

Additionally, or alternatively, in a fifth procedure, the UE 115-*a* may define a downlink assignment index (DAI) relative to a monitoring occasion of the reference PDCCH candidate. In this fifth procedure, the UE 115-*a* may select the reference PDCCH candidate according to which of the monitored PDCCH candidates 210 is an earlier (or earliest) PDCCH candidate 210 relative to a remainder of the monitored PDCCH candidates 210. Such use of the reference PDCCH candidate for setting a DAI is illustrated by and described in more detail with reference to FIG. 4.

Additionally, or alternatively, in a sixth procedure, the UE 115-*a* may select a QCL assumption for a scheduled PDSCH (such as the PDSCH transmission 215) based on a CORESET with a lower ID among the CORESETs associated with the linked PDCCH candidates 210 if a transmission configuration indicator (TCI) field is absent from the DCI and if the scheduling offset (as measured from the reference PDCCH candidate) is equal to or greater than a time duration of a configured timeDurationForQCL parameter. In other words, if the PDSCH is scheduled by DCI that is carried by the set of linked PDCCH candidates 210, if the TCI field is absent from the DCI, and if the scheduling offset between the reference PDCCH candidate and the scheduled PDSCH is equal to or greater than timeDurationForQCL, the UE 115-*a* may select the QCL assumption for the PDSCH based on the CORESET having the lowest ID of CORESETs associated with the linked PDCCH candidates 210. In this sixth procedure, the UE 115-*a* may select, as the reference PDCCH candidate, the PDCCH candidate 210 from the monitored PDCCH candidates 210 associated with the CORESET having the lowest ID.

Additionally, or alternatively, in a seventh procedure, the UE 115-*a* may rate-match a PDSCH (such as the PDSCH transmission 215) scheduled by the DCI carried over the linked PDCCH candidates 210 around the linked PDCCH candidates 210 if the PDSCH has a starting symbol that is the same as or later than a first symbol of the reference PDCCH candidate. In this seventh procedure, the UE 115-*a* may select the reference PDCCH candidate in accordance with which of the monitored PDCCH candidates 210 has a later (or latest) starting symbol relative to a remainder of the monitored PDCCH candidates 210. Such a rate-matching of the PDSCH around the set of linked PDCCH candidates 210 if the PDSCH has a starting symbol that is the same as or later than the first symbol of the reference PDCCH candidate is illustrated by and described in more detail with reference to FIG. 5.

As such, for each or for any combination of such various procedures, the UE 115-*a* and the BS 105-*a* may define a communication timeline in accordance with (or with reference to) the selected reference PDCCH candidate. In some examples, however, ambiguity may potentially arise due to the BS 105-*a* lacking awareness or insight into which PDCCH candidates 210 are actually decoded by the UE 115-*a* and a lack of a procedure or rule for reference PDCCH candidate selection in examples in which the UE 115-*a* drops one or more of the linked PDCCH candidates 210. For example, as described in each of the various procedures that rely on or use a reference PDCCH candidate, the UE 115-*a* may define the scheduling information or restrictions that are obtained from or based on the DCI as a function of resources occupied by the reference PDCCH candidate, which the UE 115-*a* may select from PDCCH candidates 210 that are actually monitored by the UE 115-*a*. In other words, the scheduling information or restrictions may be a function of the resources of the detected DCI (for example, the DCI decoded by the UE 115-*a*). As such, if the UE 115-*a* drops one of the linked PDCCH candidates 210, ambiguity or inconsistency may arise between the UE 115-*a* and the BS 105-*a* as to which PDCCH candidate 210 is the reference PDCCH candidate if the BS 105-*a* is unaware of which PDCCH candidates 210 the UE 115-*a* drops and if the UE 115-*a* and the BS 105-*a* lack a mutually understood procedure for accounting for such PDCCH candidate dropping.

The UE 115-*a* may drop (from a set of monitored PDCCH candidates 210) a PDCCH candidate 210 in various scenarios. For example, the UE 115-*a* may drop a PDCCH candidate 210 as a result of PDCCH overbooking, if resources of the PDCCH candidate 210 overlap with higher priority signaling (such as a synchronization signal block (SSB)), if resources of the PDCCH candidate 210 overlap with resources that are configured for rate-matching, if symbols of the PDCCH candidate 210 are configured or otherwise selected as uplink symbols, or based on a QCL prioritization (such as a QCL-Type D prioritization).

In some examples, for instance, the UE 115-*a* may have (according to a UE capability) a monitored PDCCH candidate limit (such as a blind decoding limit) or a CCE limit for PDCCH monitoring within a slot. In some aspects, such as in aspects in which the UE 115-*a* uses four downlink serving cells or fewer, the UE 115-*a* may have separate PDCCH candidate or CCE limits per downlink serving cell according to a basic unit of a limit for one component carrier. Such limits for monitored PDCCH candidates and non-overlapping CCEs may be fixed (for example, statically configured) and depend on a subcarrier spacing (SCS), as shown in Tables 1 and 2, respectively. In such aspects, the UE 115-*a* may feature such a per downlink serving cell limit instead of a total limit (for example, an upper limit across all downlink serving cells).

TABLE 1

Maximum Number of Monitored PDCCH Candidates Per
Slot for a Downlink BWP with SCS Configuration
$\mu \in \{0, 1, 2, 3\}$ for a Single Serving Cell

| $\mu$ | Maximum number of monitored PDCCH candidates per slot and per serving cell |
|---|---|
| 0 | 44 |
| 1 | 36 |
| 2 | 22 |
| 3 | 20 |

TABLE 2

Maximum Number of Non-overlapped CCEs Per Slot
for a Downlink BWP with SCS Configuration
$\mu \in \{0, 1, 2, 3\}$ for a Single Serving Cell

| $\mu$ | Maximum number of non-overlapped CCEs per slot and per serving cell |
|---|---|
| 0 | 56 |
| 1 | 56 |
| 2 | 48 |
| 3 | 32 |

In some other aspects, such as in aspects in which the UE 115-*a* uses more than four downlink serving cells, the UE 115-*a* may indicate a total capability or a total limit (for example, via a pdcch-BlindDetectionCA parameter). In some examples, the total capability or the total limit for monitored PDCCH candidates 210 or non-overlapping CCEs may be an integer larger than or equal to four. The UE 115-*a* may define the total limit across downlink serving cells with a same SCS based on the pdcch-BlindDetectionCA parameter, a number of downlink component carriers, and a total number of component carriers. In such aspects in which the UE 115-*a* uses more than four downlink serving cells, the UE 115-*a* may define a per-scheduled cell limit as a minimum between a total limit of the UE 115-*a* and the basic unit of the limit as shown in Tables 1 and 2.

As a result of such limits of the UE 115-*a* for PDCCH monitoring, the UE 115-*a* may monitor a number of PDCCH candidates 210 up to the limit of the UE 115-*a* and may thereafter drop any other PDCCH candidates 210 for which the UE 115-*a* is configured to monitor. For example, in some deployments, the BS 105-*a* (for example, the network) may configure the UE 115-*a* with a number of PDCCH candidates 210 that may result in an exceeding of a limit (for one or both of blind decoding of PDCCH candidates or CCEs) for a primary cell of the UE 115-*a* and, as such, the UE 115-*a* may monitor configured PDCCH candidates 210 and CCEs up to the limit of the UE 115-*a*. In some aspects, the BS 105-*a* may refrain from overbooking the UE 115-*a* for any secondary cells and the overbooking may be with respect to the per-scheduled cell limit of the primary cell.

In some examples, the UE 115-*a* may allocate PDCCH candidates 210 and CCEs for monitoring in accordance with a configured allocation rule. As part of such a configured allocation rule, the UE 115-*a* may include, in a monitored set of PDCCH candidates 210, PDCCH candidates 210 or CCEs corresponding to common search space (CSS) sets (as CSS sets may be associated with a relatively higher priority and, as such, the UE 115-*a* may refrain from dropping PDCCH candidates 210 or CCEs corresponding to CSS sets). The UE 115-*a*, upon including the PDCCH candidates 210 or CCEs corresponding to the CSS sets, may calculate a remaining limit for additional PDCCH candidates 210 or CCEs and may allocate additional PDCCH candidates 210 or CCEs corresponding to UE-specific search space (USS) sets starting with a USS set having a lowest index and iteratively allocating PDCCH candidates 210 or CCEs corresponding to USS sets having progressively higher indexes until the decoding limit of the UE 115-*a* is reached.

In other words, for example, the UE 115-*a* may allocate a first number of PDCCH candidates 210 or CCEs corresponding to the USS set having the lowest index (if that number is less than the remaining limit after including the PDCCH candidates 210 or CCEs corresponding to the CSS sets), calculate a second remaining limit after including the first number of PDCCH candidates 210 or CCEs, and, if the second remaining limit is larger than a second number of PDCCH candidates 210 or CCEs corresponding to a USS set having a next lowest index, the UE 115-*a* may additionally allocate the second number of PDCCH candidates 210 or CCEs for monitoring and calculate a third remaining limit as a result of subtracting the second number of PDCCH candidates 210 or CCEs from the second remaining limit. The UE 115-*a* may similarly go on to a next number of PDCCH candidates 210 or CCEs corresponding to a next USS set and repeat until a quantity of PDCCH candidates 210 or CCEs for that next USS set exceeds a remaining limit of available PDCCH candidates 210 or CCEs.

Additionally, or alternatively, the UE 115-*a* may drop a PDCCH candidate 210 (from a set of monitored PDCCH candidates 210) if the PDCCH candidate 210 overlaps with higher priority signaling, such as an SSB. For example, if the UE 115-*a* receives an ssb-PositionInBurst parameter in ServingCellConfigCommon for a serving cell, refrains from monitoring PDCCH candidates in a Type0-PDCCH CSS set, and at least one resource element for the PDCCH candidate 210 overlaps with at least one resource element of a candidate SSB or physical broadcast channel (PBCH) block corresponding to an SSB or PBCH block index provided by the ssb-PositionInBurst parameter in the ServingCellConfigCommon, the UE 115-*a* may refrain from monitoring the PDCCH candidate 210.

Additionally, or alternatively, the UE 115-*a* may refrain from monitoring for a PDCCH candidate 210 if the PDCCH candidate 210 occupies resources that at least partially overlap with resources that are configured for rate-matching. For example, a first set of resources may be configured such that the first set of resources are unavailable for PDSCH reception and, in examples in which the UE 115-*a* receives a PDSCH transmission over resources that at least partially overlap with the first set of resources, the UE 115-*a* (and the BS 105-*a*) may rate-match the PDSCH transmission around the first set of resources. In examples in which a PDCCH candidate occupies resources that at least partially overlap with the first set of resources, however, the UE 115-*a* may refrain from monitoring or drop the PDCCH candidate 210.

In some aspects, the UE 115-*a* may receive an indication of such a first set of resources (around which PDSCH is rate-matched and PDCCH is dropped) from the BS 105-*a*. For example, the UE 115-*a* may receive a resourceBlocks parameter and a symbolsInResourceBlock parameter in a RateMatchPattern parameter or may (additionally) receive a periodicityAndPattern parameter in the RateMatchPattern parameter indicating the first set of resources. In some examples, the first set of resources may include one or more resource blocks in one or more symbols of a slot that are unavailable for PDSCH reception. Accordingly, the UE 115-*a* may refrain from monitoring the PDCCH candidate 210 if the PDCCH candidate 210 is mapped to one or more resource elements that overlap with resource elements of any resource block of the one or more resource blocks in the one or more symbols of the first set of resources.

Additionally, or alternatively, the UE 115-*a* may refrain from monitoring for a PDCCH candidate 210 if the PDCCH candidate 210 overlaps with resources (such as symbols) that are designated for uplink communication at the UE 115-*a*. Such a conflict between uplink signaling and downlink signaling may occur for various reasons, including as a result of a semi-static TDD configuration, as a result of an overlapping of resources of the PDCCH candidate with resources of a physical random access channel (PRACH) occasion, as a result of a dynamic TDD configuration, or as a result of a dynamic grant scheduling an uplink channel, among other examples.

In some examples, for instance, the UE 115-*a* may receive a semi-static TDD configuration from the BS 105-*a* indicating a set of symbols of a slot that are configured as uplink symbols and the UE may refrain from receiving a downlink transmission (such as a PDCCH candidate 210, a PDSCH transmission, or a CSI-RS) if the downlink transmission overlaps, at least partially, with the set of symbols of the slot that are configured as uplink symbols. In some aspects, the UE 115-*a* may receive the semi-static TDD configuration indicating the set of symbols that are configured as uplink symbols via a tdd-UL-DLConfigurationCommon parameter or a tdd-UL-DL-ConfigurationDedicated parameter.

In some other examples, the UE 115-*a* may refrain from monitoring for a PDCCH candidate 210 if the PDCCH candidate 210 overlaps with a set of symbols of a slot that correspond to a valid PRACH occasion or overlaps with a set of symbols before the valid PRACH occasion. Further, the UE 115-*a* may similarly refrain from receiving a PDSCH transmission or a CSI-RS in the slot if reception of the PDSCH transmission or the CSI-RS would overlap with any symbol from the set of symbols corresponding to the valid PRACH occasion or the set of symbols before the valid PRACH occasion.

In some other examples, the UE 115-*a* may refrain from monitoring for a PDCCH candidate 210 as a result of some indication via a slot format indicator (SFI) index field. For example, the UE 115-*a* may receive an indication of a set of symbols of a slot that are configured as flexible symbols via a tdd-UL-DLConfigurationCommon parameter or a tdd-UL-DL-ConfigurationDedicated parameter or via DCI (such as a DCI format 2_0) providing a format for the slot using a slot format value other than 255. In such examples, if one or more symbols from the set of symbols that are configured as flexible symbols are symbols in a CORESET configured to the UE for PDCCH monitoring, the UE 115-*a* may receive a PDCCH candidate 210 in the CORESET if an SFI-index field value in the DCI (such as the DCI format 2_0) indicates that the one or more symbols are downlink symbols. In other words, the UE 115-*a* may refrain from monitoring for a PDCCH candidate 210 if the UE 115-*a* detects an SFI in DCI format 2_0 and if the SFI is absent of an indication for downlink symbols.

In some other examples, the UE 115-*a* may refrain from monitoring for a PDCCH candidate 210 if the UE 115-*a* receives a dynamic grant scheduling an uplink transmission over at least partially overlapping resources as the PDCCH candidate 210. For example, for a dynamic grant scheduling a transmission over an uplink channel or an uplink reference signal, if the UE 115-*a* receives a configuration from higher layers to receive a downlink transmission (such as a PDCCH, a PDSCH, a CSI-RS, or a downlink positioning reference signal (PRS)) in a set of symbols of a slot, the UE 115-*a* may refrain from receiving the downlink transmission if the UE 115-*a* detects a DCI format scheduling the UE 115-*a* to transmit an uplink transmission (such as a PUSCH, a PUCCH, a PRACH, or an SRS) in at least one symbol of the set of symbols of the slot configured for the downlink transmission.

Additionally, or alternatively, the UE 115-*a* may refrain from monitoring a PDCCH candidate 210 as a result of or in connection with a QCL prioritization (such as a QCL-Type D prioritization). For example, the UE 115-*a* may be unable to receive multiple beams (having different QCL-TypeD properties) simultaneously on a same serving cell or on multiple serving cells in a same frequency band in a carrier aggregation operation mode. In some aspects, the UE 115-*a* may feature a configuration of one or more priority rules for PDCCH monitoring to support such avoidance of the UE 115-*a* to receive multiple beams simultaneously. For instance, in some examples, if the UE 115-*a* features a configuration for single cell operation or for operation with carrier aggregation in a same frequency band and if the UE 115-*a* monitors PDCCH candidates 210 in overlapping PDCCH monitoring occasions in multiple CORESETs that have a same or different QCL-TypeD properties on one or more active downlink BWPs of one or more cells, the UE 115-*a* may monitor PDCCH candidates 210 in a first CORESET, and any other CORESET from the multiple CORESETs having same QCL-TypeD properties as the first CORESET, on the active downlink BWP of a cell from the one or more cells.

In such examples, the first CORESET may correspond to a CSS set with a lowest index in the cell with the lowest index containing CSS, if any, or, alternatively, the first CORESET may correspond to a USS set with a lowest index in the cell with a lowest index. In some aspects, the UE 115-*a* may identify, select, or determine the lowest USS set index over all USS sets with at least one PDCCH candidate 210 in overlapping PDCCH monitoring occasions. In other words, the UE 115-*a* may select a CORESET in accordance with a priority rule and the UE 115-*a* may monitor for PDCCH candidates 210 in the CORESET and in any CORESET that has the same QCL-TypeD properties as the selected CORESET. Such a priority rule may be with respect to, firstly, whether the CORESET corresponds to a CSS set (associated with a relatively higher priority) or a USS set (associated with a relatively lower priority) and, secondly, to component carrier or serving cell index (in which a lowest index has a highest priority) and, thirdly, to SS set index (in which a lowest index has a highest priority).

As such, the UE 115-*a* may potentially refrain from monitoring for one or more PDCCH candidates 210 of the set of linked PDCCH candidates 210 and, in some examples, such a refrainment from monitoring one or more of the set of linked PDCCH candidates 210 may result in ambiguity between the UE 115-*a* and the BS 105-*a* as to which PDCCH candidates 210 each of the UE 115-*a* and the BS 105-*a* recognize as linked PDCCH candidates 210 and as to how a reference PDCCH candidate is selected from the linked PDCCH candidates 210. For example, if the UE 115-*a* drops a first PDCCH candidate 210 of the linked PDCCH candidates 210, the UE 115-*a* and the BS 105-*a* may lack a mutually understood procedure for managing the linked PDCCH candidates 210 and, likewise, may lack a mutually understood procedure for selecting the reference PDCCH candidate for the linked PDCCH candidates 210.

Accordingly, in some implementations, the UE 115-*a* and the BS 105-*a* may employ one or more mutually understood rules or procedures for managing a set of linked PDCCH candidates 210 and for selecting a reference PDCCH candidate for the set of linked PDCCH candidates 210 in examples in which the UE 115-*a* drops (or refrains from monitoring) at least one PDCCH candidate 210 of the set of linked PDCCH candidates 210. In some aspects, such a specifying of a behavior for the UE 115-*a* and the BS 105-*a* in accordance with the one or more mutually understood rules or procedures may reduce ambiguity between the UE 115-*a* and the BS 105-*a* and, in turn, increase a likelihood for successful communication between the UE 115-*a* and the BS 105-*a*.

In some examples, for instance, the UE 115-*a* and the BS 105-*a* may employ a mutually understood PDCCH candidate linking procedure to update the linking between the linked PDCCH candidates 210 as a result of a dropping of one or more of the linked PDCCH candidates 210. Such PDCCH candidate linking procedures are illustrated by and described in more detail with reference to FIGS. 6-8. In some other examples, the UE 115-*a* and the BS 105-*a* may employ a mutually understood PDCCH candidate monitoring procedure to update for which PDCCH candidates 210 the UE 115-*a* monitors as a result of dropping one PDCCH candidate 210 of the set of linked PDCCH candidates 210. Such PDCCH candidate monitoring procedures are illustrated by and described in more detail with reference to FIGS. 9-11.

In some other examples, the UE 115 and the BS 105 may employ a mutually understood rule for maintaining the linking of the linked PDCCH candidates 210 and for selecting a reference PDCCH candidate from the set of linked PDCCH candidates 210 irrespective of a dropping of one or more of the set of linked PDCCH candidates 210 (even if the reference PDCCH candidate is dropped). As such, the UE 115-*a* and the BS 105-*a* may keep the PDCCH candidate 210-*a* and the PDCCH candidate 210-*b* linked even if the UE 115-*a* refrains from monitoring one of the PDCCH candidate 210-*a* or the PDCCH candidate 210-*b*. In such examples, the UE 115-*a* and the BS 105-*a* may employ a reference selection rule to select the reference PDCCH candidate for the set of linked PDCCH candidates 210 regardless of which of the set of linked PDCCH candidates 210 are monitored or unmonitored.

In some aspects, the UE 115-*a* and the BS 105-*a* may employ such a selecting of the reference PDCCH candidate from the set of linked PDCCH candidates 210 including both monitored and unmonitored PDCCH candidates 210 to reduce a potential for ambiguity resulting from missed signaling. For example, in some scenarios, the UE 115-*a* may drop a PDCCH candidate 210 as a result of receiving DCI (such as DCI indicating uplink symbols or downlink symbols, or both) and, if the UE 115-*a* misses the DCI, the UE 115-*a* may monitor for the PDCCH candidate 210 and keep the PDCCH candidate 210 within the set of linked PDCCH candidates 210. The BS 105-*a*, on the other hand (and if employing a procedure that would update the linking of the set of linked PDCCH candidates 210 as a result of a dropped PDCCH candidate 210), may remove the dropped PDCCH candidate 210 from the set of linked PDCCH candidates 210 in accordance with the DCI signaling. As such, the UE 115-*a* and the BS 105-*a* may have different understandings of the set of linked PDCCH candidates 210, which may potentially result in the UE 115-*a* and the BS 105-*a* selecting a different reference PDCCH candidate. Thus, if the UE 115-*a* and the BS 105-*a* maintain the linking of the set of linked PDCCH candidates 210 regardless of PDCCH dropping, the UE 115-*a* and the BS 105-*a* may avoid such potential ambiguity resulting from missed signaling.

Figure 3:
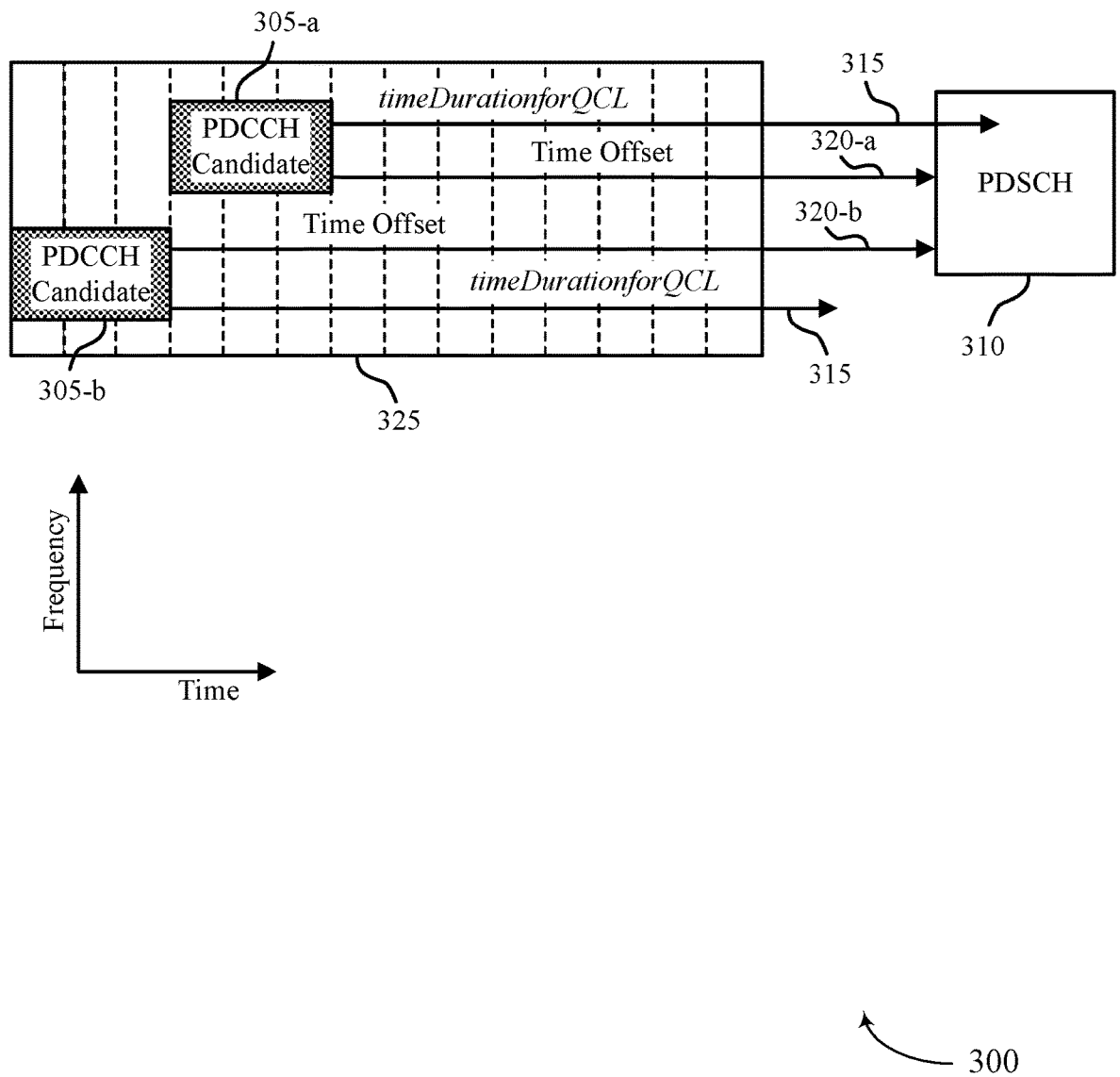
FIGS. 3-5 illustrate example communication timelines that support techniques for unlinking PDCCH candidates due to PDCCH candidate dropping in deployments featuring PDCCH repetition.

FIG. 3 illustrates an example communication timeline 300 that supports techniques for unlinking PDCCH candidates due to PDCCH candidate dropping in deployments featuring PDCCH repetition. The communication timeline 300 may implement or be implemented to realize aspects of the wireless communications system 100 or the signaling diagram 200. For example, a UE 115 and a BS 105, or one or more components of a BS 105, (which may be examples of corresponding devices described herein, including with reference to FIGS. 1 and 2) may communicate in accordance with the communication timeline 300 and may select a QCL assumption for a PDSCH transmission 310 (or a CSI-RS) based on a timer measured from a reference PDCCH candidate for a set of linked PDCCH candidates 305.

For example, the UE 115 may receive a configuration of the set of linked PDCCH candidates 305 within a slot 325 including a PDCCH candidate 305-*a* and a PDCCH candidate 305-*b*, and each of the PDCCH candidate 305-*a* and the PDCCH candidate 305-*b* may include or convey a same DCI or PDCCH information. In some examples, the set of linked PDCCH candidates 305 may include or convey PDSCH scheduling information associated with the PDSCH transmission 310 or a CSI-RS. In such examples in which the set of linked PDCCH candidates 305 schedule the PDSCH transmission 310 or the CSI-RS, the UE 115 may select or otherwise determine the QCL assumption for the PDSCH transmission 310 or the CSI-RS based on a timeDurationForQCL timer 315 and a time offset 320 as measured from a reference PDCCH candidate. In some aspects, the UE 115 and the BS 105 may select a later PDCCH candidate 305 (such as the PDCCH candidate 305-*a*) as the reference PDCCH candidate and, likewise, may measure the timeDurationForQCL timer 315 and the time offset 320-*a* relative to the PDCCH candidate 305-*a*.

In some examples, to select the QCL assumption for the PDSCH transmission 310, the UE 115 and the BS 105 may measure the time offset 320-*a* between the PDCCH candidate 305-*a* and the PDSCH transmission 310 and may determine whether the measured time offset 320-*a* is less than or greater than the timeDurationForQCL timer 315 (as also measured from the PDCCH candidate 305-*a* as a result of selecting the PDCCH candidate 305-*a* as the reference PDCCH candidate). For example, if the time offset 320-*a* is less than the timeDurationForQCL timer 315, the UE 115 and the BS 105 may select and use a default QCL assumption, such as a default beam, (for QCL-TypeD) for the PDSCH transmission 310.

In some scenarios, however, the UE 115 may refrain from monitoring one of the linked PDCCH candidates 305 and, as such, the UE 115 and the BS 105 may potentially select different PDCCH candidates 305 as a reference PDCCH candidate. For example, if the UE 115 drops the PDCCH candidate 305-*a* from a set of monitored PDCCH candidates 305, the UE 115 may select the PDCCH candidate 305-*b* as the reference PDCCH candidate (as the PDCCH candidate 305-*b* includes the DCI that is actually decoded by the UE 115) while the BS 105 may still select the PDCCH candidate 305-*a* as the reference PDCCH candidate. As a result of such ambiguity between the UE 115 and the BS 105, the UE 115 and the BS 105 may potentially select different QCL assumptions for the PDSCH transmission 310. For example, the UE 115 may select a first QCL assumption for the PDSCH transmission 310 as a result of determining that a time offset 320-*b* between the PDCCH candidate 305-*b* and the PDSCH transmission 310 is greater than the timeDurationForQCL timer 315 (as measured from the PDCCH candidate 305-b) while the BS 105 may select a second (and different) QCL assumption for the PDSCH transmission 310 as a result of determining that the time offset 320-a is less than the timeDurationForQCL timer 315 (as measured from the PDCCH candidate 305-a).

Accordingly, in some implementations, the UE 115 and the BS 105 may employ mutually understood rules or procedures for maintaining a common understanding of the set of linked PDCCH candidates 305 and for selecting, for the commonly understood set of linked PDCCH candidates 305, a common reference PDCCH candidate. As such, in some examples, the UE 115 and the BS 105 may select a same QCL assumption for the scheduled PDSCH transmission 310 (or for a scheduled CSI-RS), which may increase a likelihood for successful communication between the UE 115 and the BS 105. Such rules or procedures that are mutually understood between the UE 115 and the BS 105 are illustrated by and described in more detail with reference to FIGS. 6-11.

Figure 4:
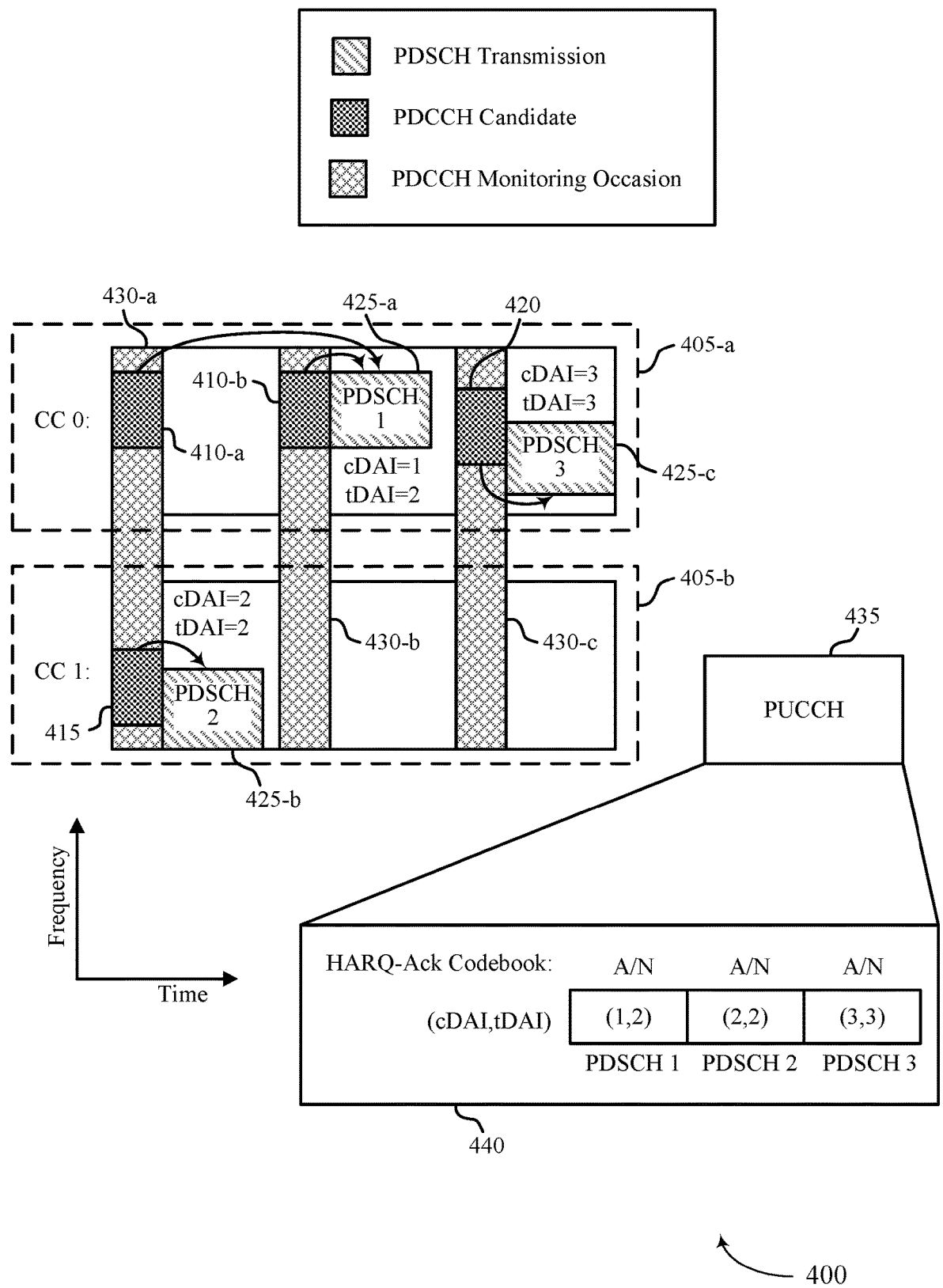

FIG. 4 illustrates an example communication timeline 400 that supports techniques for unlinking PDCCH candidates due to PDCCH candidate dropping in deployments featuring PDCCH repetition. The communication timeline 400 may implement or be implemented to realize aspects of the wireless communications system 100 or the signaling diagram 200. For example, a UE 115 and a BS 105, or one or more components of a BS 105, (which may be examples of corresponding devices described herein, including with reference to FIGS. 1 and 2) may communicate in accordance with the communication timeline 400 and may construct a HARQ-ACK codebook 440 for one or more PDSCH transmissions 425 that are scheduled by DCI conveyed over various PDCCH candidates.

For example, the UE 115 may receive, from the BS 105 over a number of PDCCH candidates, DCI scheduling a number of PDSCH transmissions 425 and the UE 115 may transmit a PUCCH transmission 435 including the HARQ-ACK codebook 440 conveying HARQ-ACK feedback for each of the PDSCH transmissions 425. For example, the UE 115 may receive DCI for a PDSCH transmission 425-a over each of a linked set of PDCCH candidates 410 (including a PDCCH candidate 410-a and a PDCCH candidate 410-b), DCI for a PDSCH transmission 425-b over a PDCCH candidate 415, and DCI for a PDSCH transmission 425-c over a PDCCH candidate 420. As shown in the communication timeline 400, the UE 115 may monitor for the number of PDCCH candidates over multiple component carriers 405, including a component carrier 405-a (which may be associated with a first serving cell) and a component carrier 405-b (which may be associated with a second serving cell), and over multiple PDCCH monitoring occasions 430, including a PDCCH monitoring occasion 430-a, a PDCCH monitoring occasion 430-b, and a PDCCH monitoring occasion 430-c.

In some examples, the UE 115 may include, within the HARQ-ACK codebook 440, information relating to a downlink assignment index (DAI) for each of the received PDSCH transmissions 425. For example, the UE 115 may include a counter DAI (cDAI) and a total DAI (tDAI) in the HARQ-ACK codebook 440 for each of the PDSCH transmission 425-a (which may be referred to herein and illustrated as a PDSCH 1), the PDSCH transmission 425-b (which may be referred to herein and illustrated as a PDSCH 2), and the PDSCH transmission 425-c (which may be referred to herein and illustrated as a PDSCH 3). The UE 115 may calculate a cDAI for each PDSCH transmission 425 in accordance with a total number of serving cell PDCCH monitoring occasions 430 minus a number of linked PDCCH candidate pairs (for example, the UE 115 may calculate cDAI according to number of {serving cell, PDCCH monitoring occasion}—pair(s)). The UE 115 may similarly calculate a tDAI for each PDSCH transmission 425, and may update the tDAI from PDCCH monitoring occasion 430 to PDCCH monitoring occasion 430.

Further, in examples in which the PDSCH transmission 425 is scheduled by a set of linked PDCCH candidates (for example, as for the PDSCH transmission 425-a scheduled by the linked PDCCH candidates 410), the UE 115 and the BS 105 may calculate the cDAI or tDAI, or both, from a reference PDCCH candidate for the linked PDCCH candidates. In some examples, the UE 115 and the BS 105 may select the reference PDCCH candidate as an earlier PDCCH candidate. As such, in the context of the linked PDCCH candidates 410, the UE 115 and the BS 105 may select the PDCCH candidate 410-a as the reference PDCCH candidate for the linked PDCCH candidates 410 and, likewise, may calculate the cDAI or the tDAI, or both, for the PDSCH transmission 425-a using the PDCCH candidate 410-a.

In some scenarios, however, the UE 115 may refrain from monitoring one of the linked PDCCH candidates 410 and, as such, the UE 115 and the BS 105 may potentially select different PDCCH candidates 410 as reference PDCCH candidates. For example, if the UE 115 drops the PDCCH candidate 410-a from a set of monitored PDCCH candidates, the UE 115 may select the PDCCH candidate 410-b as the reference PDCCH candidate (as the PDCCH candidate 410-b includes the DCI that is actually decoded by the UE 115) while the BS 105 may still select the PDCCH candidate 410-a as the reference PDCCH candidate. As a result of such ambiguity between the UE 115 and the BS 105, the UE 115 and the BS 105 may potentially calculate different cDAI and tDAI values for the PDSCH transmission 425-a scheduled by the linked PDCCH candidates 410, which may result in incompatibility or confusion between the UE 115 and the BS 105 as to which PDSCH transmission 425 the UE 115 is referring to in the HARQ-ACK codebook 440.

Accordingly, in some implementations, the UE 115 and the BS 105 may employ mutually understood rules or procedures for maintaining a common understanding of the set of linked PDCCH candidates 410 and for selecting, for the commonly understood set of linked PDCCH candidates 410, a common reference PDCCH candidate. As such, in some examples, the UE 115 and the BS 105 may calculate same cDAI and tDAI values for the scheduled PDSCH transmission 425-a, which may increase a likelihood for successful communication between the UE 115 and the BS 105. Such rules or procedures that are mutually understood between the UE 115 and the BS 105 are illustrated by and described in more detail with reference to FIGS. 6-11.

Figure 5:
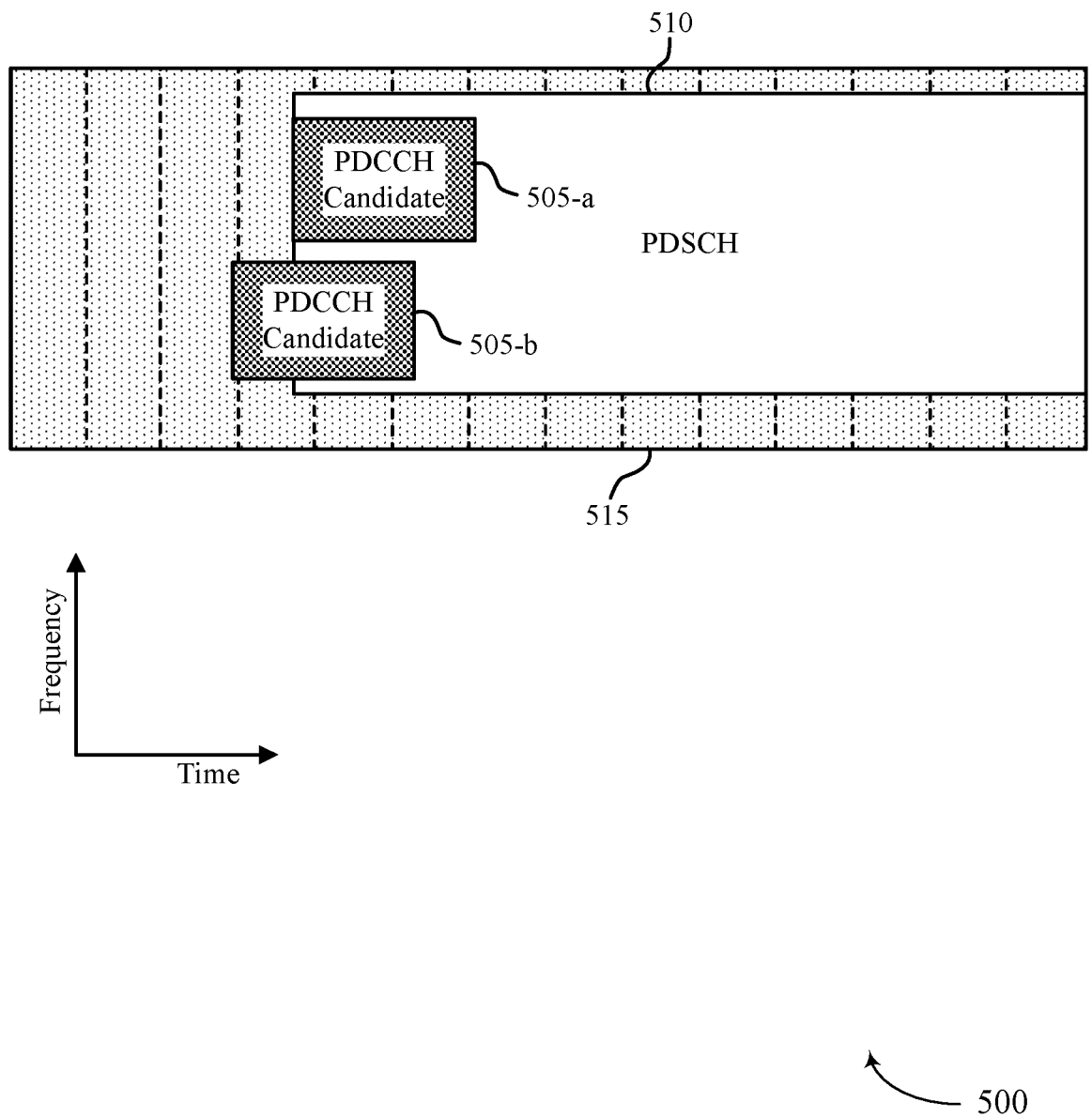

FIG. 5 illustrates an example communication timeline 500 that supports techniques for unlinking PDCCH candidates due to PDCCH candidate dropping in deployments featuring PDCCH repetition. The communication timeline 500 may implement or be implemented to realize aspects of the wireless communications system 100 or the signaling diagram 200. For example, a UE 115 and a BS 105, or one or more components of a BS 105, (which may be examples of corresponding devices described herein, including with reference to FIGS. 1 and 2) may communicate in accordance with the communication timeline 500 and may rate-match a PDSCH transmission 510 around resources of a set of linked PDCCH candidates 505 if the PDSCH transmission 510 has a starting symbol in a same or later symbol than a reference PDCCH candidate of the set of linked PDCCH candidates 505.

For example, the UE 115 may receive a configuration of the set of linked PDCCH candidates 505 within a slot 515 including a PDCCH candidate 505-*a* and a PDCCH candidate 505-*b*, and each of the PDCCH candidate 505-*a* and the PDCCH candidate 505-*b* may include or convey a same DCI or PDCCH information. In some examples, the set of linked PDCCH candidates 505 may include or convey scheduling information associated with the PDSCH transmission 510. In such examples in which the set of linked PDCCH candidates 505 schedule the PDSCH transmission 510, the UE 115 and the BS 105 may rate-match the PDSCH transmission 510 around the resources occupied or used by the PDCCH candidates 505 if the PDSCH transmission 510 is scheduled for resources that overlap with the PDCCH candidates 505 and is scheduled for a symbol period that is in a same symbol period or a later symbol period than a first symbol period of a reference PDCCH candidate for the set of linked PDCCH candidates 505.

As such, the UE 115 and the BS 105 may select the reference PDCCH candidate for the set of linked PDCCH candidates 505 and may determine whether the PDSCH transmission 510 has a starting symbol that is the same as or later than a starting symbol of the reference PDCCH candidate. In some examples, the UE 115 and the BS 105 may select a later PDCCH candidate 505 (such as the PDCCH candidate 505-*a*) as the reference PDCCH candidate for the set of linked PDCCH candidates 505 and, accordingly, may determine that the PDSCH transmission 510 is scheduled for a same starting symbol as a starting symbol of the reference PDCCH candidate. As such, the UE 115 and the BS 105 may expect a rate-matching of the PDSCH transmission 510 around the resources occupied or used by the PDCCH candidates 505.

In some scenarios, however, the UE 115 may refrain from monitoring one of the linked PDCCH candidates 505 and, as such, the UE 115 and the BS 105 may potentially select different PDCCH candidates 505 as reference PDCCH candidates. For example, if the UE 115 drops the PDCCH candidate 505-*a* from a set of monitored PDCCH candidates, the UE 115 may select the PDCCH candidate 505-*b* as the reference PDCCH candidate (as the PDCCH candidate 505-*b* includes the DCI that is actually decoded by the UE 115) while the BS 105 may still select the PDCCH candidate 505-*a* as the reference PDCCH candidate. As a result of such ambiguity between the UE 115 and the BS 105, the UE 115 and the BS 105 may potentially reach different conclusions on whether or not the BS 105 transmits the PDSCH transmission 510 (and similarly whether the PDSCH transmission 510 is rate-matched around the resources occupied by the PDCCH candidates 505). For example, if the UE 115 refrains from monitoring the PDCCH candidate 505-*a*, the UE 115-*a* may be unaware that the BS 105 rate-matches the PDSCH transmission 510 around resources occupied by the PDCCH candidate 505-*a*.

Accordingly, in some implementations, the UE 115 and the BS 105 may employ mutually understood rules or procedures for maintaining a common understanding of the set of linked PDCCH candidates 505 and for selecting, for the commonly understood set of linked PDCCH candidates 505, a common reference PDCCH candidate. As such, in some examples, the UE 115 and the BS 105 may reach same conclusions as to whether the BS 105 rate-matches the PDSCH transmission 510 around the resources occupied by the PDCCH candidates 505, which may increase a likelihood for successful communication between the UE 115 and the BS 105. Such rules or procedures that are mutually understood between the UE 115 and the BS 105 are illustrated by and described in more detail with reference to FIGS. 6-11.

Figure 6:
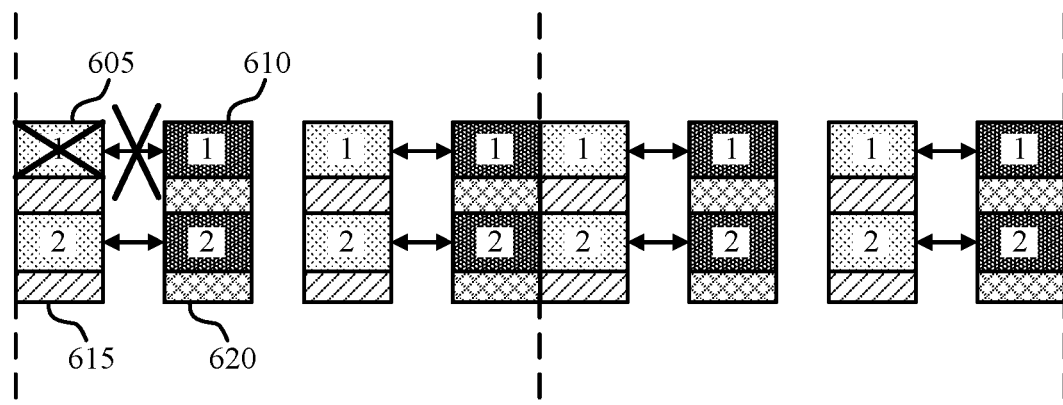
FIGS. 6-8 illustrate example PDCCH candidate linking procedures that support techniques for unlinking PDCCH candidates due to PDCCH candidate dropping in deployments featuring PDCCH repetition.
Figure 6:
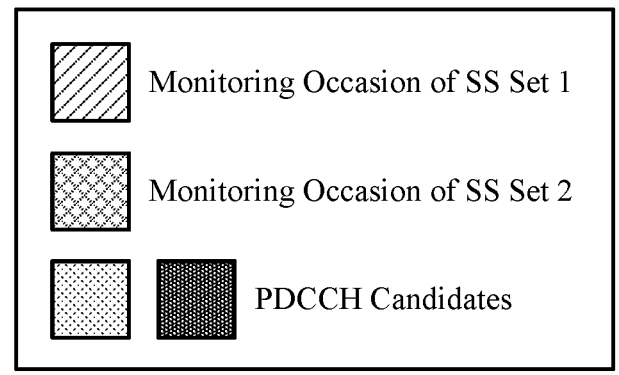

FIG. 6 illustrates an example PDCCH candidate linking procedure 600 that supports techniques for unlinking PDCCH candidates due to PDCCH candidate dropping in deployments featuring PDCCH repetition. The PDCCH candidate linking procedure 600 may implement or be implemented to realize aspects of the wireless communications system 100 or the signaling diagram 200. For example, a UE 115 and a BS 105, or one or more components of a BS 105, (which may be examples of corresponding devices described herein, including with reference to FIGS. 1 and 2) may employ the PDCCH candidate linking procedure 600 to update a linking between a set of linked PDCCH candidates in examples in which the UE 115 refrains from monitoring one of the linked PDCCH candidates (or otherwise selects to monitor a subset of the linked PDCCH candidates).

For example, the UE 115 may receive an indication from the BS 105 of a set of linked PDCCH candidates including a first PDCCH candidate 605 associated with a first monitoring occasion 615 of a first SS set (for example, an SS set 1) and a second PDCCH candidate 610 associated with a second monitoring occasion 620 of a second SS set (for example, an SS set 2). In some examples, the UE 115 may select to monitor the second PDCCH candidate 610 as a result of a resource conflict (or as a result of some other PDCCH dropping rule) associated with the first PDCCH candidate 605. As such, the UE 115 may monitor for the second PDCCH candidate 610 and may refrain from monitoring for the first PDCCH candidate 605.

In some implementations, and as a result of or in response to the UE 115 refraining from monitoring for the first PDCCH candidate 605, the UE 115 and the BS 105 may commonly employ the PDCCH candidate linking procedure 600 to unlink the second PDCCH candidate 610 (the PDCCH candidate that is monitored by the UE 115) from the first PDCCH candidate 605. As such, the UE 115 and the BS 105 may consider the second PDCCH candidate 610 as an individual or standalone PDCCH candidate without being associated with a reference, such that the UE 115 and the BS 105 may define scheduling information or restrictions relative to the second PDCCH candidate 610 (which may be treated as the individual or standalone PDCCH candidate or, equivalently, as a PDCCH candidate that is associated with a single, non-repeated instance of DCI) without selecting a reference PDCCH candidate.

Equivalently, the UE 115 and the BS 105 may consider the second PDCCH candidate 610 as the reference PDCCH candidate as a result of unlinking the second PDCCH candidate 610 from the first PDCCH candidate 605 and, accordingly, may define scheduling information or restrictions relative to the second PDCCH candidate 610. As such, the UE 115 and the BS 105 may achieve a common understanding of a PDCCH candidate from which to define scheduling information or restrictions, which may increase compatibility and consistency between the UE 115 and the BS 105 and, in turn, increase the likelihood for successful communication between the UE 115 and the BS 105.

Figure 7:
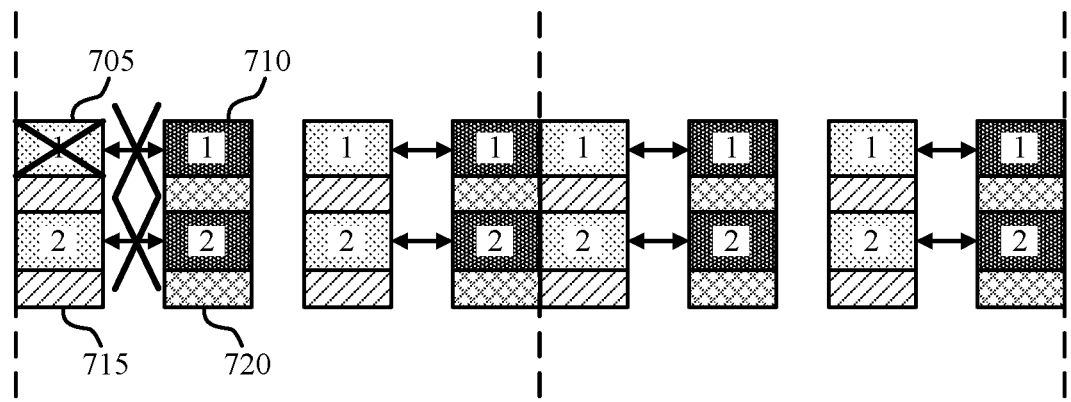
Figure 7:
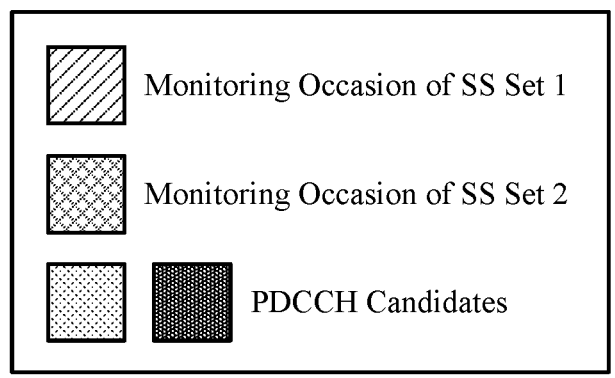

FIG. 7 illustrates an example PDCCH candidate linking procedure 700 that supports techniques for unlinking PDCCH candidates due to PDCCH candidate dropping in deployments featuring PDCCH repetition. The PDCCH candidate linking procedure 700 may implement or be implemented to realize aspects of the wireless communications system 100 or the signaling diagram 200. For example, a UE 115 and a BS 105, or one or more components of a BS 105, (which may be examples of corresponding devices described herein, including with reference to FIGS. 1 and 2) may employ the PDCCH candidate linking procedure 700 to update a linking between a set of linked PDCCH candidates in examples in which the UE 115 refrains from monitoring one of the linked PDCCH candidates (or otherwise selects to monitor a subset of the linked PDCCH candidates).

For example, the UE 115 may receive an indication from the BS 105 of a set of linked PDCCH candidates including a first PDCCH candidate 705 associated with a first monitoring occasion 715 of a first SS set (for example, an SS set 1) and a second PDCCH candidate 710 associated with a second monitoring occasion 720 of a second SS set (for example, an SS set 2). In some examples, the UE 115 may select to monitor the second PDCCH candidate 710 as a result of a resource conflict (or as a result of some other PDCCH dropping rule) associated with the first PDCCH candidate 705. As such, the UE 115 may monitor for the second PDCCH candidate 710 and may refrain from monitoring for the first PDCCH candidate 705.

In some implementations, and as a result of or in response to the UE 115 refraining from monitoring for the first PDCCH candidate 705, the UE 115 and the BS 105 may commonly employ the PDCCH candidate linking procedure 700 to unlink the second monitoring occasion 720 associated with the second PDCCH candidate 710 (the PDCCH candidate that is monitored by the UE 115) from the first monitoring occasion 715 associated with the first PDCCH candidate 705. As such, the UE 115 and the BS 105 may unlink all PDCCH candidates in the first monitoring occasion 715 and the second monitoring occasion 720. For example, if there are two pairs of linked PDCCH candidates across the first monitoring occasion 715 and the second monitoring occasion 720, the UE 115 and the BS 105 may unlink all four PDCCH candidates if there is at least one pair of linked PDCCH candidates for which one of the two is dropped (as may occur between the first PDCCH candidate 705 and the second PDCCH candidate 710).

In accordance with the unlinking of the various PDCCH candidates across the two monitoring occasions, the UE 115 and the BS 105 may treat each PDCCH candidate as an individual or standalone PDCCH candidate (such as a PDCCH candidate that is associated with a single, non-repeated instance of DCI) and, accordingly, may refrain from selecting a reference PDCCH candidate for those unlinked PDCCH candidates. As such, the UE 115 and the BS 105 may achieve a common understanding of a PDCCH candidate from which to define scheduling information or restrictions, which may increase compatibility and consistency between the UE 115 and the BS 105 and, in turn, increase the likelihood for successful communication between the UE 115 and the BS 105.

Further, although shown as including two pairs of linked PDCCH candidates, the first monitoring occasion 715 and the second monitoring occasion 720 may include any number of pairs of linked PDCCH candidates without exceeding the scope of the present disclosure. For example, if there are 10 pairs of linked PDCCH candidates in the first monitoring occasion 715 and the second monitoring occasion 720, the UE 115 and the BS 105 may unlink all 20 PDCCH candidates as a result of the dropping of the first PDCCH candidate 705.

Figure 8:
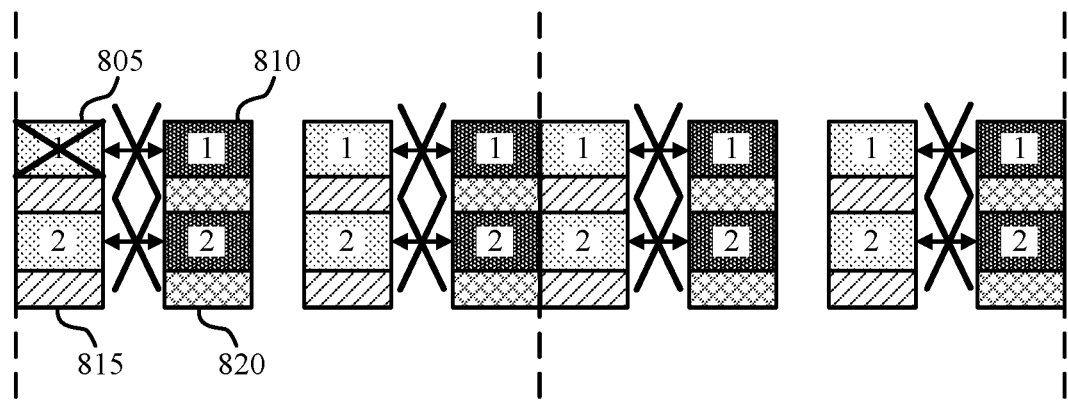
Figure 8:
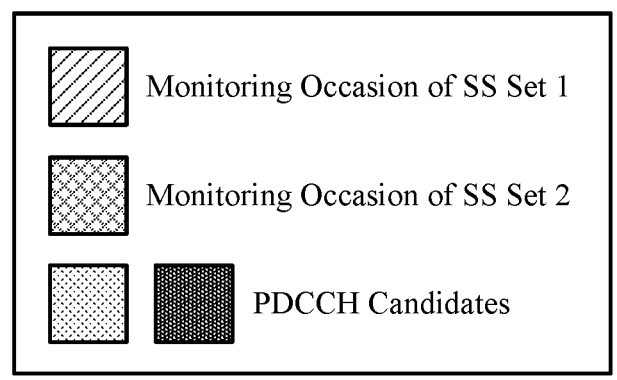

FIG. 8 illustrates an example PDCCH candidate linking procedure 800 that supports techniques for unlinking PDCCH candidates due to PDCCH candidate dropping in deployments featuring PDCCH repetition. The PDCCH candidate linking procedure 800 may implement or be implemented to realize aspects of the wireless communications system 100 or the signaling diagram 200. For example, a UE 115 and a BS 105, or one or more components of a BS 105, (which may be examples of corresponding devices described herein, including with reference to FIGS. 1 and 2) may employ the PDCCH candidate linking procedure 800 to update a linking between a set of linked PDCCH candidates in examples in which the UE 115 refrains from monitoring one of the linked PDCCH candidates (or otherwise selects to monitor a subset of the linked PDCCH candidates).

For example, the UE 115 may receive an indication from the BS 105 of a set of linked PDCCH candidates including a first PDCCH candidate 805 associated with a first monitoring occasion 815 of a first SS set (for example, an SS set 1) and a second PDCCH candidate 810 associated with a second monitoring occasion 820 of a second SS set (for example, an SS set 2). In some examples, the UE 115 may select to monitor the second PDCCH candidate 810 as a result of a resource conflict (or as a result of some other PDCCH dropping rule) associated with the first PDCCH candidate 805. As such, the UE 115 may monitor for the second PDCCH candidate 810 and may refrain from monitoring for the first PDCCH candidate 805.

In some implementations, and as a result of or in response to the UE 115 refraining from monitoring for the first PDCCH candidate 805, the UE 115 and the BS 105 may commonly employ the PDCCH candidate linking procedure 800 to unlink the second SS set associated with the second PDCCH candidate 810 (the PDCCH candidate that is monitored by the UE 115) from the first SS set associated with the first PDCCH candidate 805. As such, the UE 115 and the BS 105 may unlink all monitoring occasions in the first SS set and the second SS set. For example, and as shown in FIG. 8, if there are four linked pairs of monitoring occasions across the first SS set and the second SS set, the UE 115 and the BS 105 may unlink all eight monitoring occasions if there is at least one pair of linked PDCCH candidates for which one of the two is dropped (as may occur between the first PDCCH candidate 805 and the second PDCCH candidate 810). Accordingly, the UE 115 and the BS 105 may likewise unlink all PDCCH candidates across the unlinked monitoring occasions.

In accordance with the unlinking of the various PDCCH candidates across the two SS sets, the UE 115 and the BS 105 may treat each PDCCH candidate as an individual or standalone PDCCH candidate (such as a PDCCH candidate that is associated with a single, non-repeated instance of DCI) and, accordingly, may refrain from selecting a reference PDCCH candidate for those unlinked PDCCH candidates. As such, the UE 115 and the BS 105 may achieve a common understanding of a PDCCH candidate from which to define scheduling information or restrictions, which may increase compatibility and consistency between the UE 115 and the BS 105 and, in turn, increase the likelihood for successful communication between the UE 115 and the BS 105.

Figure 9:
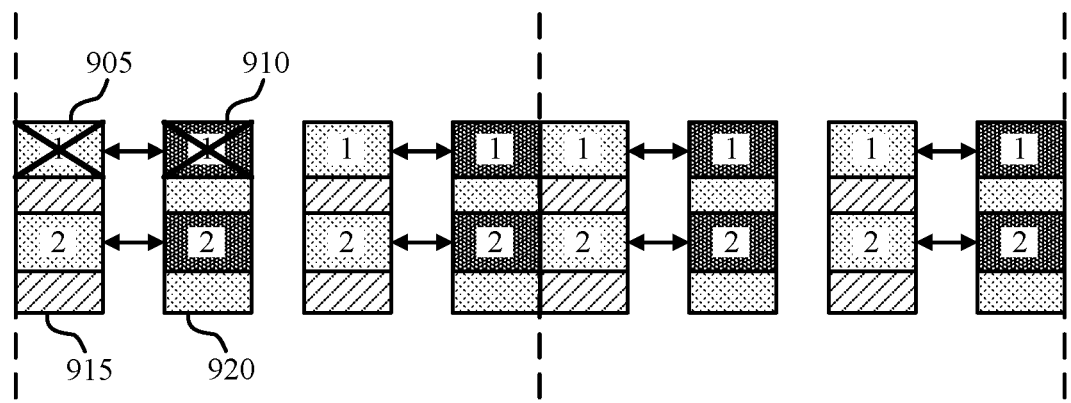
FIGS. 9-11 illustrate example PDCCH candidate monitoring procedures that support techniques for unlinking PDCCH candidates due to PDCCH candidate dropping in deployments featuring PDCCH repetition.
Figure 9:
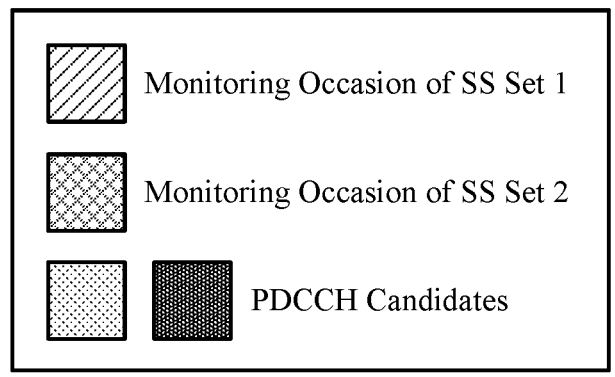

FIG. 9 illustrates an example PDCCH candidate monitoring procedure 900 that supports techniques for unlinking PDCCH candidates due to PDCCH candidate dropping in deployments featuring PDCCH repetition. The PDCCH candidate monitoring procedure 900 may implement or be implemented to realize aspects of the wireless communications system 100 or the signaling diagram 200. For example, a UE 115 and a BS 105, or one or more components of a BS 105, (which may be examples of corresponding devices described herein, including with reference to FIGS. 1 and 2) may employ the PDCCH candidate monitoring procedure 900 to update a set of monitored PDCCH candidates in examples in which the UE 115 refrains from monitoring one of the linked PDCCH candidates (or otherwise selects to monitor a subset of the linked PDCCH candidates).

For example, the UE 115 may receive an indication from the BS 105 of a set of linked PDCCH candidates including a first PDCCH candidate 905 associated with a first monitoring occasion 915 of a first SS set (for example, an SS set 1) and a second PDCCH candidate 910 associated with a second monitoring occasion 920 of a second SS set (for example, an SS set 2). In some examples, the UE 115 may refrain from monitoring the first PDCCH candidate 905 as a result of a resource conflict (or as a result of some other PDCCH dropping rule). In some implementations, and as a result of or in response to the UE 115 refraining from monitoring for the first PDCCH candidate 905, the UE 115 and the BS 105 may commonly employ the PDCCH candidate monitoring procedure 900 to classify both the first PDCCH candidate 905 and the second PDCCH candidate 910 as unmonitored PDCCH candidates.

In other words, if the UE 115 drops, from a set of monitored PDCCH candidates, the first PDCCH candidate 905 of the set of linked PDCCH candidates, the UE 115 also may drop a remainder of the set of linked PDCCH candidates (including the second PDCCH candidate 910). As such, the UE 115 may instead monitor for one or more other PDCCH candidates outside of the set of linked PDCCH candidates. Alternatively, the UE 115 may monitor for other downlink signaling from the BS 105, may transmit uplink signaling to the BS 105, or may refrain from communicating with the BS 105 instead of monitoring for any PDCCH candidate of the linked set of PDCCH candidates. In some aspects, such a dropping of the monitoring for the set of linked PDCCH candidates may reduce ambiguity between the UE 115 and the BS 105 as a result of avoiding scenarios in which ambiguity may arise.

Figure 10:
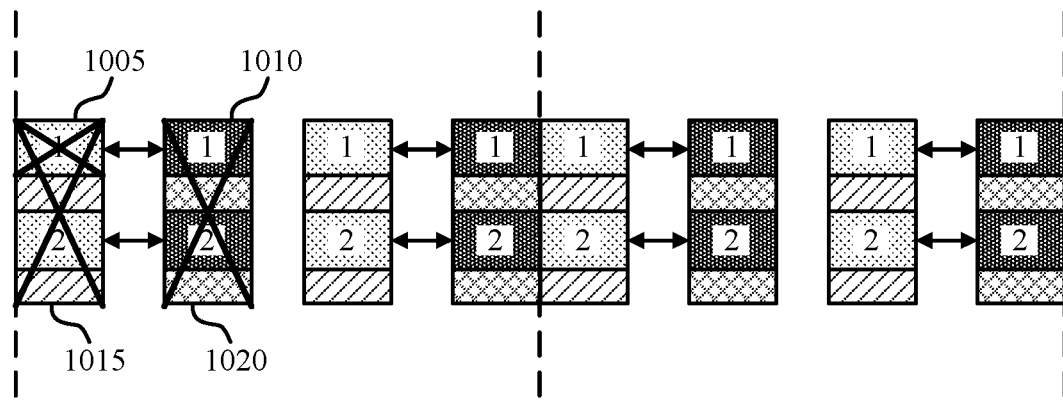
Figure 10:
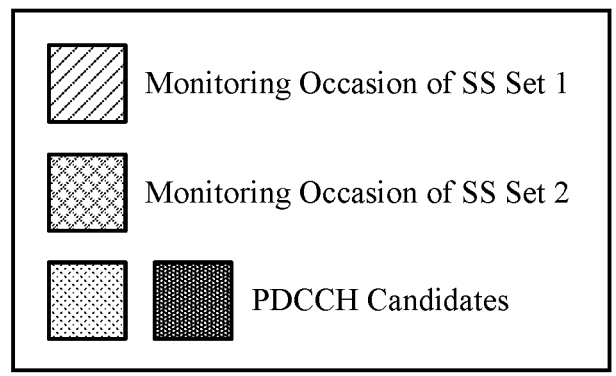

FIG. 10 illustrates an example PDCCH candidate monitoring procedure 1000 that supports techniques for unlinking PDCCH candidates due to PDCCH candidate dropping in deployments featuring PDCCH repetition. The PDCCH candidate monitoring procedure 1000 may implement or be implemented to realize aspects of the wireless communications system 100 or the signaling diagram 200. For example, a UE 115 and a BS 105, or one or more components of a BS 105, (which may be examples of corresponding devices described herein, including with reference to FIGS. 1 and 2) may employ the PDCCH candidate monitoring procedure 1000 to update a set of monitored PDCCH candidates in examples in which the UE 115 refrains from monitoring one of the linked PDCCH candidates (or otherwise selects to monitor a subset of the linked PDCCH candidates).

For example, the UE 115 may receive an indication from the BS 105 of a set of linked PDCCH candidates including a first PDCCH candidate 1005 associated with a first monitoring occasion 1015 of a first SS set (for example, an SS set 1) and a second PDCCH candidate 1010 associated with a second monitoring occasion 1020 of a second SS set (for example, an SS set 2). In some examples, the UE 115 may refrain from monitoring the first PDCCH candidate 1005 as a result of a resource conflict (or as a result of some other PDCCH dropping rule). In some implementations, and as a result of or in response to the UE 115 refraining from monitoring for the first PDCCH candidate 1005, the UE 115 and the BS 105 may commonly employ the PDCCH candidate monitoring procedure 1000 to classify both the first monitoring occasion 1015 associated with the first PDCCH candidate 1005 and the second monitoring occasion 1020 associated with the second PDCCH candidate 1010 as unmonitored monitoring occasions.

In other words, if the UE 115 drops, from a set of monitored PDCCH candidates, the first PDCCH candidate 1005 of the set of linked PDCCH candidates, the UE 115 also may drop other PDCCH candidates associated with the first monitoring occasion 1015 and the second monitoring occasion 1020. As such, the UE 115 may instead monitor for one or more other PDCCH candidates outside of the first monitoring occasion 1015 and the second monitoring occasion 1020. Alternatively, the UE 115 may monitor for other downlink signaling from the BS 105, may transmit uplink signaling to the BS 105, or may refrain from communicating with the BS 105 instead of monitoring over the first monitoring occasion 1015 and the second monitoring occasion 1020. In some aspects, such a dropping of the monitoring over the monitoring occasions associated with the set of linked PDCCH candidates may reduce ambiguity between the UE 115 and the BS 105 as a result of avoiding scenarios in which ambiguity may arise.

Figure 11:
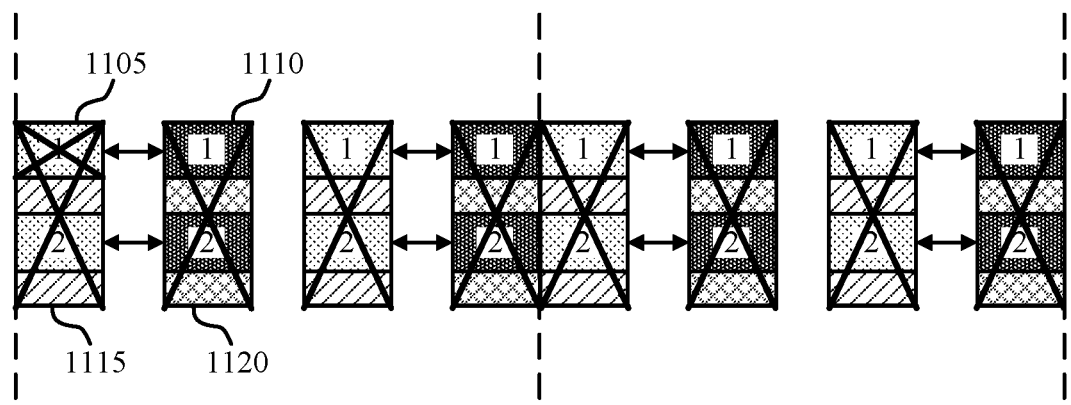
Figure 11:
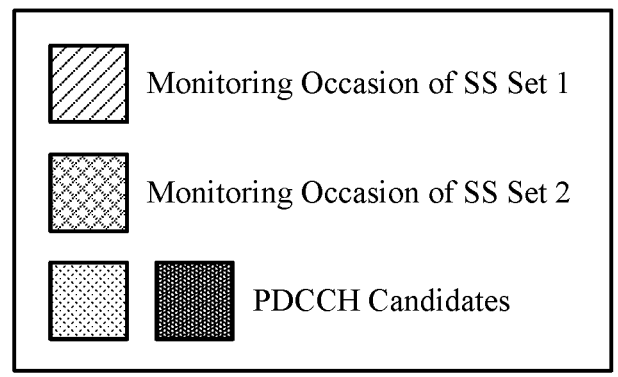

FIG. 11 illustrates an example PDCCH candidate monitoring procedure 1100 that supports techniques for unlinking PDCCH candidates due to PDCCH candidate dropping in deployments featuring PDCCH repetition. The PDCCH candidate monitoring procedure 1100 may implement or be implemented to realize aspects of the wireless communications system 100 or the signaling diagram 200. For example, a UE 115 and a BS 105, or one or more components of a BS 105, (which may be examples of corresponding devices described herein, including with reference to FIGS. 1 and 2) may employ the PDCCH candidate monitoring procedure 1100 to update a set of monitored PDCCH candidates in examples in which the UE 115 refrains from monitoring one of the linked PDCCH candidates (or otherwise selects to monitor a subset of the linked PDCCH candidates).

For example, the UE 115 may receive an indication from the BS 105 of a set of linked PDCCH candidates including a first PDCCH candidate 1105 associated with a first monitoring occasion 1115 of a first SS set (for example, an SS set 1) and a second PDCCH candidate 1110 associated with a second monitoring occasion 1120 of a second SS set (for example, an SS set 2). In some examples, the UE 115 may refrain from monitoring the first PDCCH candidate 1105 as a result of a resource conflict (or as a result of some other PDCCH dropping rule). In some implementations, and as a result of or in response to the UE 115 refraining from monitoring for the first PDCCH candidate 1105, the UE 115 and the BS 105 may commonly employ the PDCCH candidate monitoring procedure 1100 to classify both the first SS set associated with the first PDCCH candidate 1105 and the second SS set associated with the second PDCCH candidate 1110 as unmonitored SS sets.

In other words, if the UE 115 drops, from a set of monitored PDCCH candidates, the first PDCCH candidate 1105 of the set of linked PDCCH candidates, the UE 115 also may drop other PDCCH candidates associated with the first SS set and the second SS set. As such, the UE 115 may instead monitor for one or more other PDCCH candidates outside of the first SS set and the second SS set. Alternatively, the UE 115 may monitor for other downlink signaling from the BS 105, may transmit uplink signaling to the BS 105, or may refrain from communicating with the BS 105 instead of monitoring over the first SS set and the second SS set. In some aspects, such a dropping of the monitoring over the SS sets associated with the set of linked PDCCH candidates may reduce ambiguity between the UE 115 and the BS 105 as a result of avoiding scenarios in which ambiguity may arise.

Figure 12:
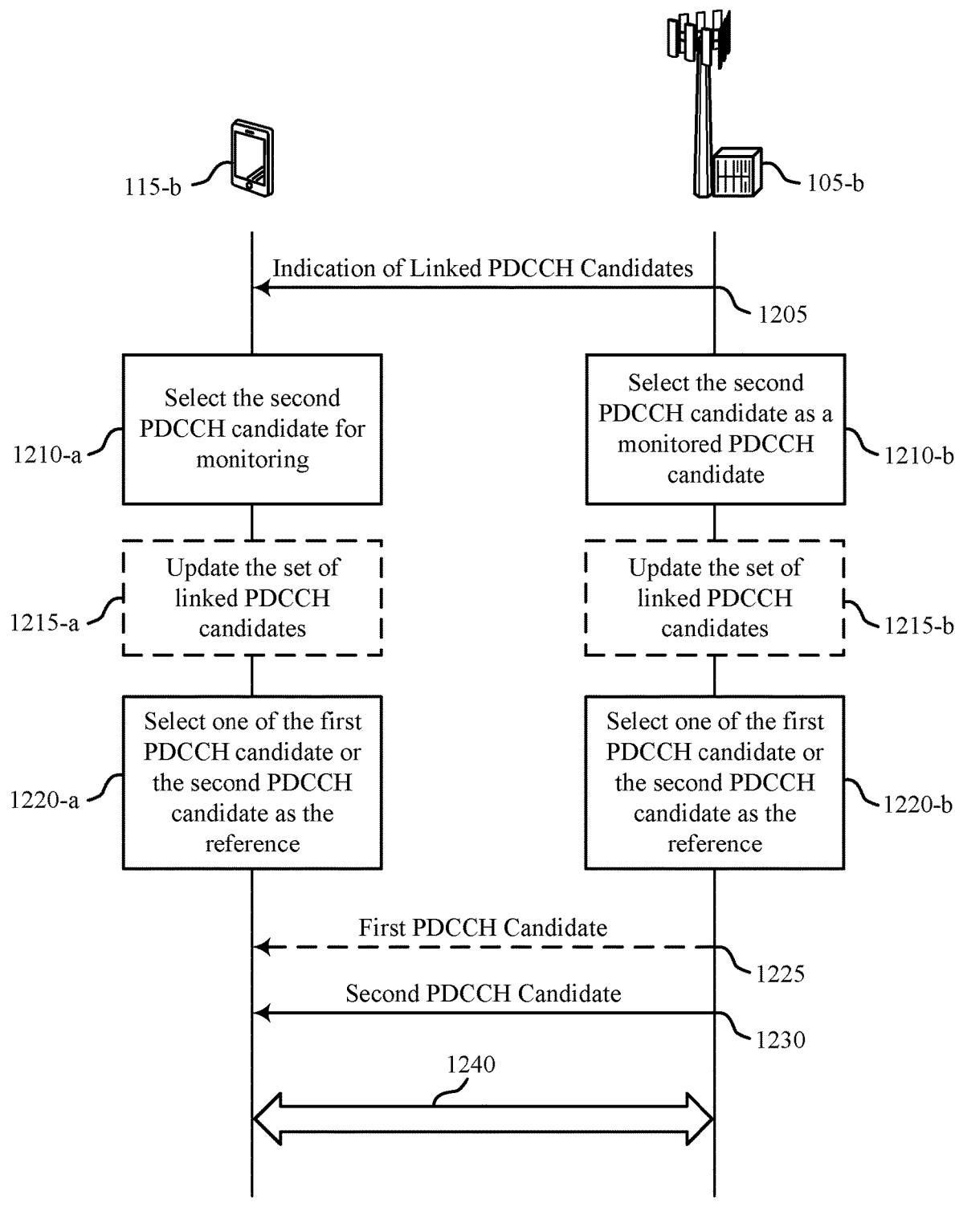
FIGS. 12 and 13 illustrate example process flows that support techniques for unlinking PDCCH candidates due to PDCCH candidate dropping in deployments featuring PDCCH repetition.

FIG. 12 illustrates an example process flow 1200 that supports techniques for unlinking PDCCH candidates due to PDCCH candidate dropping in deployments featuring PDCCH repetition. The process flow 1200 may implement or be implemented to realize aspects of the wireless communications system 100 or the signaling diagram 200. For example, the process flow 1200 may illustrate communication between a UE 115-*b* and a BS 105-*b*, or one or more components of the BS 105-*b*, which may be examples of corresponding devices described herein, including with reference to FIGS. 1 and 2. In some examples, the UE 115-*b* may select to monitor a subset of a set of linked PDCCH candidates as a result of a resource conflict or in accordance with some other dropping rule and, as such, the UE 115-*b* and the BS 105-*b* may employ one or more rules or procedures for maintaining a common understanding of the set of linked PDCCH candidates and for selecting a reference PDCCH candidate for the set of linked PDCCH candidates.

In the following description of the process flow 1200, the operations may be performed (for example, reported or provided) in a different order than the order shown, or the operations performed by the UE 115-*b* and the BS 105-*b* may be performed in different orders or at different times. For example, specific operations also may be left out of the process flow 1200, or other operations may be added to the process flow 1200. Further, although some operations or signaling may be shown to occur at different times for discussion purposes, these operations may actually occur at the same time.

At 1205, the UE 115-*b* may receive, from the BS 105-*b*, an indication of a set of linked PDCCH candidates including a first PDCCH candidate and a second PDCCH candidate. In some examples, the first PDCCH candidate and the second PDCCH candidate may be associated with a same PDCCH information (such as a same DCI). For example, the set of linked PDCCH candidates may be linked for repetition of the same PDCCH information such that each PDCCH candidate of the set of linked PDCCH candidates carries the same PDCCH information (for example, the same DCI).

At 1210-*a*, the UE 115-*b* may select the second PDCCH candidate for monitoring according to a resource conflict (or in accordance with any other dropping rule) associated with the first PDCCH candidate. Similarly, at 1210-*b*, the BS 105-*b* may select the second PDCCH candidate as a monitored PDCCH candidate according to the resource conflict associated with the first PDCCH candidate. For example, the UE 115-*b* may be unable to monitor for the first PDCCH candidate as a result of a PDCCH candidate overbooking, a scheduling conflict, or a priority rule for PDCCH monitoring, or any combination thereof. As such, the UE 115-*b* may drop, from a set of monitored PDCCH candidates, the first PDCCH candidate.

At 1215-*a*, the UE 115-*b* may update, in accordance with selecting the second PDCCH candidate for monitoring and dropping the first PDCCH candidate, the set of linked PDCCH candidates to obtain an updated set of linked PDCCH candidates. Similarly, at 1215-*b*, the BS 105-*b* may update, in accordance with selecting the second PDCCH candidate as a monitored PDCCH candidate and selecting the first PDCCH candidate as an unmonitored or dropped PDCCH candidate, the set of linked PDCCH candidates to obtain an updated set of linked PDCCH candidates. In some examples, the UE 115-*b* and the BS 105-*b* may update the set of linked PDCCH candidates as a result of unlinking the second PDCCH candidate from the first PDCCH candidate, unlinking a first monitoring occasion associated with the first PDCCH candidate from a second monitoring occasion associated with the second PDCCH candidate, or unlinking a first SS set associated with the first PDCCH candidate from a second SS set associated with the second PDCCH candidate. Such an updating of the set of linked PDCCH candidates is illustrated by and described in more detail herein with reference to FIGS. 6-8.

At 1220-*a*, the UE 115-*b* may select one of the first PDCCH candidate or the second PDCCH candidate as a reference (such as a reference PDCCH candidate) for the set of linked PDCCH candidates (or for the updated set of linked PDCCH candidates) in connection with selecting the second PDCCH candidate for monitoring. Similarly, at 1220-*b*, the BS 105-*b* may select one of the first PDCCH candidate or the second PDCCH candidate as the reference (such as the reference PDCCH candidate) for the set of linked PDCCH candidates (or for the updated set of linked PDCCH candidates) in connection with selecting the second PDCCH candidate as a monitored PDCCH candidate. In some examples, the UE 115-*b* and the BS 105-*b* may select the reference as a result of selecting the second PDCCH candidate for monitoring by the UE 115-*b* and dropping the first PDCCH candidate from the set of monitored PDCCH candidates. In other words, the selecting of the reference for the set of linked PDCCH candidates (or for the updated set of linked PDCCH candidates) may be triggered by the monitoring of a subset of the set of linked PDCCH candidates by the UE 115-*b*.

At 1225, the BS 105-*b* may, in some implementations, output a first instance of the PDCCH information over the first PDCCH candidate. In other words, for example, the BS 105-*b* may transmit the first instance of the PDCCH information to the UE 115-*b* over the first PDCCH candidate. In some other implementations, the BS 105-*b* may refrain from outputting the PDCCH information over the first PDCCH candidate as a result of selecting the second PDCCH candidate as a monitored PDCCH candidate and selecting the first PDCCH candidate as a dropped or unmonitored PDCCH candidate. In some examples, and as a result of the resource conflict (or other dropping rule), the UE 115-*b* may refrain from monitoring for the first PDCCH candidate even if the BS 105-*b* outputs the first instance of the PDCCH information over the first PDCCH candidate.

At 1230, the BS 105-*b* may output a second instance of the PDCCH information over the second PDCCH candidate. In other words, for example, the BS 105-*b* may transmit the second instance of the PDCCH information to the UE 115-*b* over the second PDCCH candidate. In some examples, the BS 105-*b* may output the second instance of the PDCCH information over the second PDCCH candidate in accordance with the selected reference and the UE 115-*b* may likewise monitor for the PDCCH information over the second PDCCH candidate in accordance with the selected reference. For example, the UE 115-*b* and the BS 105-*b* may define any scheduling information or restrictions associated with the PDCCH information relative to the selected reference. In some examples, for instance, the UE 115-*b* and the BS 105-*b* may define the scheduling information as a function of a time domain property or a frequency domain property of the selected reference.

At 1240, the UE 115-*b* may communicate with the BS 105-*b* in accordance with the selected reference. For example, the UE 115-*b* and the BS 105-*b* may define the scheduling information as a function of the time domain property or the frequency domain property of the selected reference and may communicate in accordance with the scheduling information.

Figure 13:
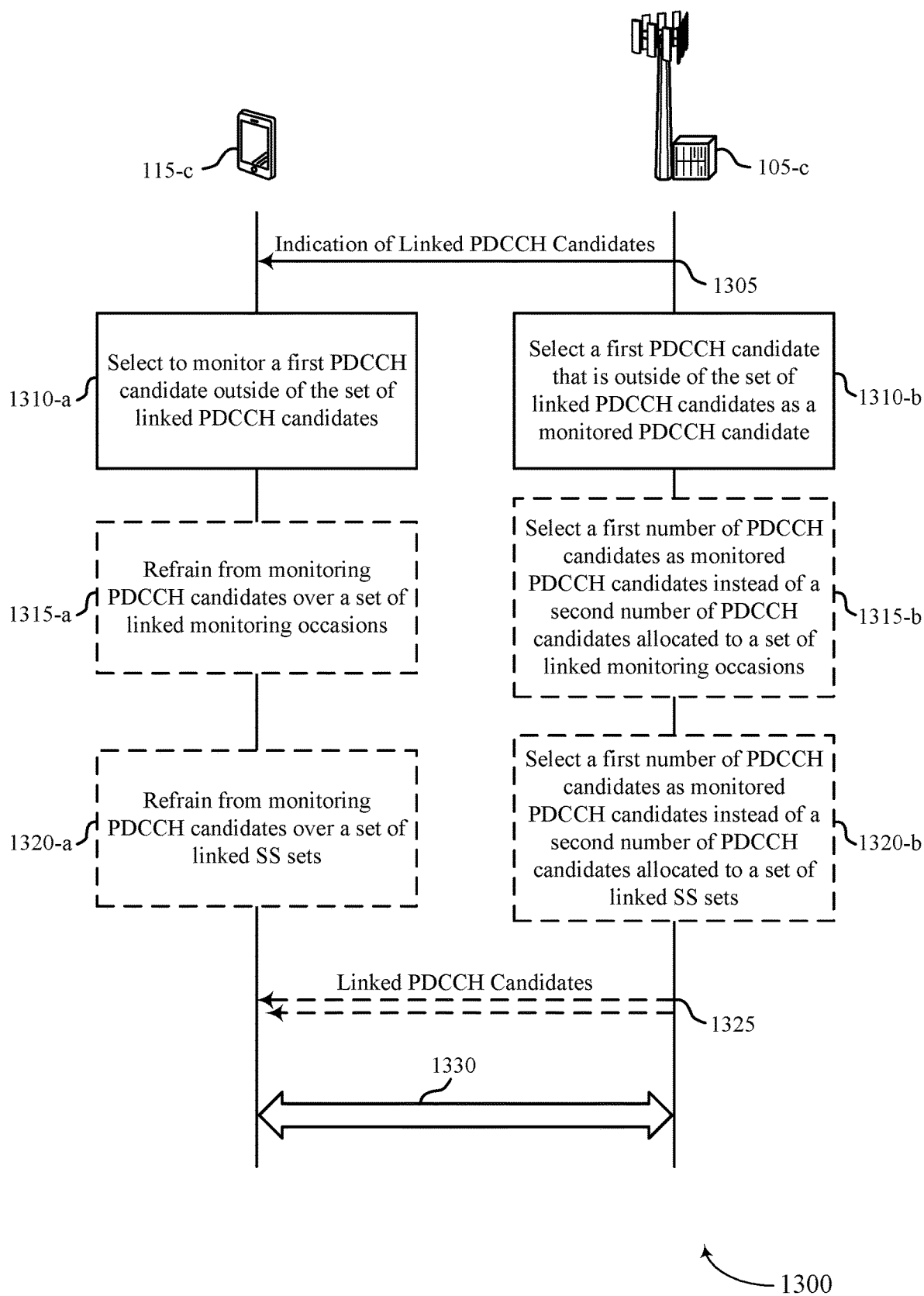

FIG. 13 illustrates an example process flow 1300 that supports techniques for unlinking PDCCH candidates due to PDCCH candidate dropping in deployments featuring PDCCH repetition. The process flow 1300 may implement or be implemented to realize aspects of the wireless communications system 100 or the signaling diagram 200. For example, the process flow 1300 may illustrate communication between a UE 115-c and a BS 105-c, or one or more components of the BS 105-c, which may be examples of corresponding devices described herein, including with reference to FIGS. 1 and 2. In some examples, the UE 115-c may refrain from monitoring for any of a set of linked PDCCH candidates as a result of a resource conflict or in accordance with some other dropping rule associated with at least one of the linked PDCCH candidates and, as such, the UE 115-c and the BS 105-c may employ one or more rules or procedures for maintaining a common understanding of how the UE 115-c refrains from monitoring for any of the set of linked PDCCH candidates.

In the following description of the process flow 1300, the operations may be performed (for example, reported or provided) in a different order than the order shown, or the operations performed by the UE 115-c and the BS 105-c may be performed in different orders or at different times. For example, specific operations also may be left out of the process flow 1300, or other operations may be added to the process flow 1300. Further, although some operations or signaling may be shown to occur at different times for discussion purposes, these operations may actually occur at the same time.

At 1305, the UE 115-c may receive, from the BS 105-c, an indication of a set of linked PDCCH candidates including a first PDCCH candidate and a second PDCCH candidate. In some examples, the first PDCCH candidate and the second PDCCH candidate may be associated with a same PDCCH information (such as a same DCI). For example, the set of linked PDCCH candidates may be linked for repetition of the same PDCCH information such that each PDCCH candidate of the set of linked PDCCH candidates carries the same PDCCH information (for example, the same DCI).

At 1310-a, the UE 115-c may select to monitor a first PDCCH candidate that is outside of the set of linked PDCCH candidates in accordance with a resource conflict (or some other dropping rule) between the first PDCCH candidate and a second PDCCH candidate that is within the set of linked PDCCH candidates. Similarly, at 1310-b, the BS 105-c may select the first PDCCH candidate that is outside of the set of linked PDCCH candidates as a monitored PDCCH candidate in accordance with the resource conflict (or some other dropping rule) between the first PDCCH candidate and the second PDCCH candidate that is within the set of linked PDCCH candidates. In some examples, the UE 115-c and the BS 105-c may select the first PDCCH candidate (that is outside of the set of linked PDCCH candidates) for monitoring by the UE 115-c instead of an entirety of the set of linked PDCCH candidates. In other words, as a result of selecting the first PDCCH candidate for monitoring by the UE 115-c, the UE 115-c may refrain from monitoring for any PDCCH candidate of the set of PDCCH candidates. Such a dropping of linked PDCCH candidates is illustrated by and described in more detail with reference to FIG. 9.

At 1315-a, the UE 115-c may, in some implementations, refrain from monitoring for a number of PDCCH candidates over a set of linked monitoring occasions that are associated with the set of linked PDCCH candidates in accordance with selecting to monitor the first PDCCH candidate instead of the entirety of the set of linked PDCCH candidates. Similarly, at 1315-b, the BS 105-c may, in some implementations, select a first number of PDCCH candidates as monitored PDCCH candidates instead of a second number of PDCCH candidates allocated to the set of linked monitoring occasions that are associated with the set of linked PDCCH candidates in accordance with selecting the first PDCCH candidate as a monitored PDCCH candidate instead of the entirety of the set of linked PDCCH candidates. Such a dropping of linked monitoring occasions is illustrated by and described in more detail with reference to FIG. 10.

At 1320-a, the UE 115-c may, in some implementations, refrain from monitoring for a number of PDCCH candidates over a set of linked SS sets that are associated with the set of linked PDCCH candidates in accordance with selecting to monitor the first PDCCH candidate instead of the entirety of the set of linked PDCCH candidates. Similarly, at 1320-b, the BS 105-c may, in some implementations, select a first number of PDCCH candidates as monitored PDCCH candidates instead of a second number of PDCCH candidates allocated to the set of linked SS sets that are associated with the set of linked PDCCH candidates in accordance with selecting the first PDCCH candidate as a monitored PDCCH candidate instead of the entirety of the set of linked PDCCH candidates. Such a dropping of linked SS sets is illustrated by and described in more detail with reference to FIG. 11.

At 1325, the BS 105-c may, in some implementations, output the PDCCH information over the set of linked PDCCH candidates. In other words, the BS 105-c may transmit the PDCCH information to the UE 115-c over the set of linked PDCCH candidates. In some other implementations, the BS 105-c may refrain from outputting the PDCCH information over the set of linked PDCCH candidates as a result of the resource conflict between the first PDCCH candidate that is outside of the set of linked PDCCH candidates and the second PDCCH candidate that is within the set of linked PDCCH candidates. In implementations in which the BS 105-c outputs the PDCCH information over the set of linked PDCCH candidates, the UE 115-c may refrain from monitoring for an entirety of the set of linked PDCCH candidates as a result of the resource conflict between the first PDCCH candidate that is outside of the set of linked PDCCH candidates and the second PDCCH candidate that is within the set of linked PDCCH candidates.

At 1330, the UE 115-c and the BS 105-c may communicate in accordance with PDCCH information conveyed over the second PDCCH candidate that the UE 115-c and the BS 105-c select for monitoring by the UE 115-c instead of the entirety of the set of linked PDCCH candidates.

Figure 14:
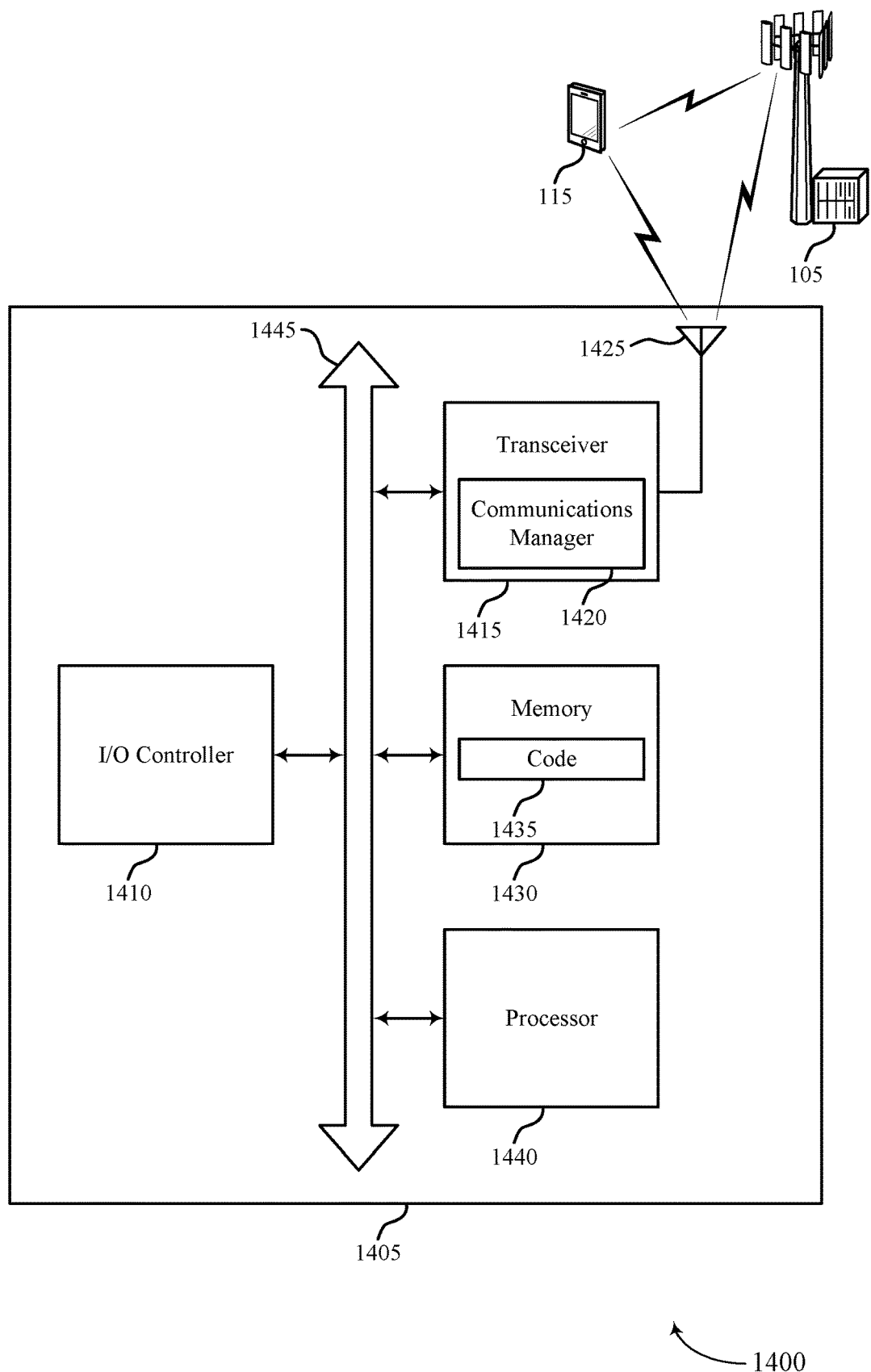
FIGS. 14 and 15 show block diagrams of example devices that support that supports techniques for unlinking PDCCH candidates due to PDCCH candidate dropping in deployments featuring PDCCH repetition.

FIG. 14 shows a block diagram 1400 of an example device 1405 that supports techniques for unlinking PDCCH candidates due to PDCCH candidate dropping in deployments featuring PDCCH repetition. The device 1405 may communicate wirelessly with one or more BSs 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (for example, operatively, communicatively, functionally, electronically, or electrically) via one or more buses (such as a bus 1445).

The I/O controller 1410 may manage input and output signals for the device 1405. The I/O controller 1410 also may manage peripherals not integrated into the device 1405. In some implementations, the I/O controller 1410 may represent a physical connection or port to an external peripheral. In some implementations, the I/O controller 1410 may utilize an operating system such as iOS®, ANDROID®, MS-DOS®, MS-WINDOWS®, OS/2®, UNIX®, LINUX®, or another known operating system. Additionally, or alternatively, the I/O controller 1410 may represent or interact with a modem, a keyboard, a mouse, a touchscreen, or a similar device. In some implementations, the I/O controller 1410 may be implemented as part of a processor, such as the processor 1440. In some implementations, a user may interact with the device 1405 via the I/O controller 1410 or via hardware components controlled by the I/O controller 1410.

In some implementations, the device 1405 may include a single antenna 1425. However, in some other implementations, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 also may include a modem to modulate the packets, to provide the modulated packets to one or more antennas 1425 for transmission, and to demodulate packets received from the one or more antennas 1425.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some implementations, the code 1435 may not be directly executable by the processor 1440 but may cause a computer (for example, if compiled and executed) to perform functions described herein. In some implementations, the memory 1430 may contain, among other things, a basic I/O system (BIOS) which may control basic hardware or software operation such as the interaction with peripheral components or devices.

The processor 1440 may be any one or more suitable processors capable of executing scripts or instructions of one or more software programs stored in the device 1405 (such as within the memory 1430). In some implementations, the processor 1440 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405.

The processing system of the device 1405 may interface with other components of the device 1405, and may process information received from other components (such as inputs or signals) or output information to other components. For example, a chip or modem of the device 1405 may include a processing system, a first interface to output information, and a second interface to obtain information. In some implementations, the first interface may refer to an interface between the processing system of the chip or modem and a transmitter, such that the device 1405 may transmit information output from the chip or modem. In some implementations, the second interface may refer to an interface between the processing system of the chip or modem and a receiver, such that the device 1405 may obtain information or signal inputs, and the information may be passed to the processing system. A person having ordinary skill in the art will readily recognize that the first interface also may obtain information or signal inputs, and the second interface also may output information or signal outputs.

The communications manager 1420 may support wireless communication at a UE in accordance with examples as disclosed herein. For example, the communications manager 1420 may be configured as or otherwise support a means for receiving an indication of a set of linked PDCCH candidates, the set of linked PDCCH candidates including a first PDCCH candidate and a second PDCCH candidate that are associated with a same PDCCH information. The communications manager 1420 may be configured as or otherwise support a means for selecting the second PDCCH candidate for monitoring according to a resource conflict associated with the first PDCCH candidate. The communications manager 1420 may be configured as or otherwise support a means for selecting one of the first PDCCH candidate or the second PDCCH candidate as a reference for the set of linked PDCCH candidates in connection with selecting the second PDCCH candidate for monitoring. The communications manager 1420 may be configured as or otherwise support a means for monitoring the second PDCCH candidate in accordance with the selected reference.

In some examples, the communications manager 1420 may be configured as or otherwise support a means for updating, in accordance with selecting the second PDCCH candidate for monitoring according to the resource conflict associated with the first PDCCH candidate, the set of linked PDCCH candidates to obtain an updated set of linked PDCCH candidates, where selecting one of the first PDCCH candidate or the second PDCCH candidate as the reference for the set of linked PDCCH candidates includes selecting the reference for the updated set of linked PDCCH candidates.

In some examples, to support updating the set of linked PDCCH candidates, the communications manager 1420 may be configured as or otherwise support a means for unlinking, from the set of linked PDCCH candidates, the first PDCCH candidate in accordance with the resource conflict associated with the first PDCCH candidate, where the updated set of linked PDCCH candidates excludes the first PDCCH candidate.

In some examples, to support updating the set of linked PDCCH candidates, the communications manager 1420 may be configured as or otherwise support a means for unlinking a first monitoring occasion associated with the first PDCCH candidate from a second monitoring occasion associated with the second PDCCH candidate in accordance with the resource conflict associated with the first PDCCH candidate, where the updated set of linked PDCCH candidates excludes the first PDCCH candidate.

In some examples, to support updating the set of linked PDCCH candidates, the communications manager 1420 may be configured as or otherwise support a means for unlinking a first number of PDCCH candidates associated with the first monitoring occasion and from a second number of PDCCH candidates associated with the second monitoring occasion.

In some examples, to support updating the set of linked PDCCH candidates, the communications manager 1420 may be configured as or otherwise support a means for unlinking a first SS set associated with the first PDCCH candidate from a second SS set associated with the second PDCCH candidate in accordance with the resource conflict associated with the first PDCCH candidate, where the updated set of linked PDCCH candidates excludes the first PDCCH candidate.

In some examples, to support updating the set of linked PDCCH candidates, the communications manager 1420 may be configured as or otherwise support a means for unlinking a first number of monitoring occasions associated with the first SS set from a second number of monitoring occasions associated with the second SS set.

In some examples, to support selecting one of the first PDCCH candidate or the second PDCCH candidate as the reference for the set of linked PDCCH candidates, the communications manager 1420 may be configured as or otherwise support a means for selecting the first PDCCH candidate or the second PDCCH candidate as the reference for the set of linked PDCCH candidates in accordance with a reference selection rule.

In some examples, the reference selection rule defines a procedure for selecting the reference from a set of PDCCH candidates including monitored PDCCH candidates and unmonitored PDCCH candidates of the set of linked PDCCH candidates.

In some examples, the communications manager 1420 may be configured as or otherwise support a means for communicating with a component of a BS in accordance with the selected reference, where scheduling information associated with the communicating with the BS is a function of a time domain property or a frequency domain property of the selected reference.

In some examples, the resource conflict associated with the first PDCCH candidate is a result of a PDCCH candidate overbooking, a scheduling conflict, or a priority rule for PDCCH monitoring, or any combination thereof.

Additionally, or alternatively, the communications manager 1420 may support wireless communication at a UE in accordance with examples as disclosed herein. For example, the communications manager 1420 may be configured as or otherwise support a means for receiving an indication of a set of linked PDCCH candidates, the set of linked PDCCH candidates including multiple PDCCH candidates that are associated with a same PDCCH information. The communications manager 1420 may be configured as or otherwise support a means for selecting to monitor a first PDCCH candidate that is outside of the set of linked PDCCH candidates in accordance with a resource conflict between the first PDCCH candidate and a second PDCCH candidate that is within the set of linked PDCCH candidates, where the first PDCCH candidate is selected instead of an entirety of the set of linked PDCCH candidates.

In some examples, the communications manager 1420 may be configured as or otherwise support a means for refraining from monitoring for a number of PDCCH candidates over a set of linked monitoring occasions that are associated with the set of linked PDCCH candidates in accordance with selecting to monitor the first PDCCH candidate instead of the entirety of the set of linked PDCCH candidates, where each of the multiple PDCCH candidates of the set of linked PDCCH candidates corresponds to a monitoring occasion of the set of linked monitoring occasions.

In some examples, the communications manager 1420 may be configured as or otherwise support a means for refraining from monitoring for a number of PDCCH candidates over a set of linked SS sets that are associated with the set of linked PDCCH candidates in accordance with selecting to monitor the first PDCCH candidate instead of the entirety of the set of linked PDCCH candidates, where each of the multiple PDCCH candidates of the set of linked PDCCH candidates corresponds to an SS set of the set of linked SS sets.

In some examples, the resource conflict between the first PDCCH candidate and the second PDCCH candidate may be a result of a PDCCH candidate overbooking, a scheduling conflict, or a priority rule for PDCCH monitoring, or any combination thereof.

In some examples, the communications manager 1420 may be configured to perform various operations (such as receiving, monitoring, or transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for unlinking PDCCH due to PDCCH candidate dropping in deployments featuring PDCCH repetition as described herein, or the processor 1440 and the memory 1430 may be otherwise configured to perform or support such operations.

Figure 15:
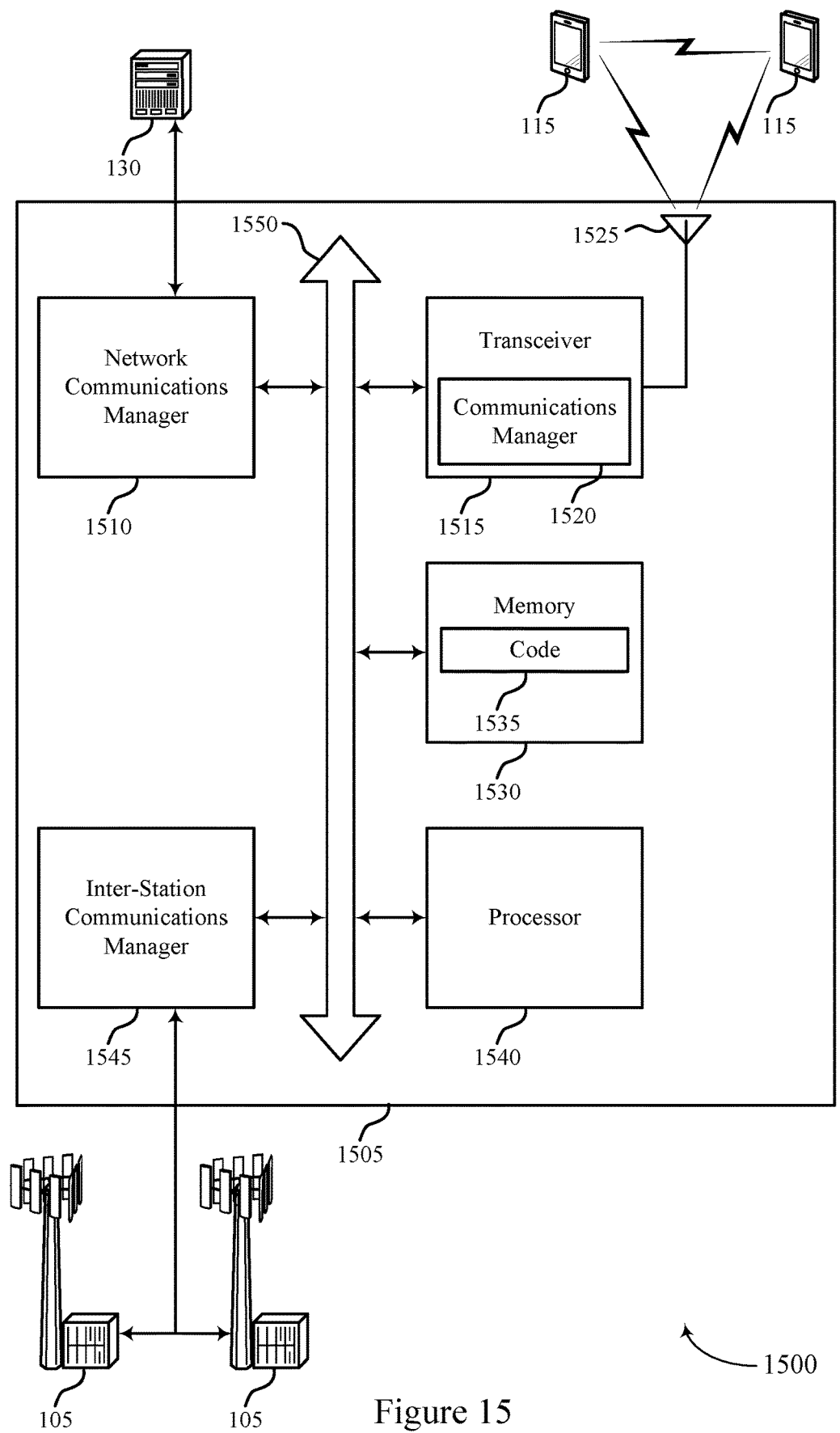

FIG. 15 shows a block diagram 1500 of an example device 1505 that supports techniques for unlinking PDCCH candidates due to PDCCH candidate dropping in deployments featuring PDCCH repetition. The device 1505 may communicate wirelessly with one or more BSs 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (for example operatively, communicatively, functionally, electronically, or electrically) via one or more buses (such as a bus 1550).

The network communications manager 1510 may manage communications with a core network 130 (for example, via one or more wired backhaul links). For example, the network communications manager 1510 may manage the transfer of data communications for client devices, such as one or more UEs 115.

In some implementations, the device 1505 may include a single antenna 1525. However, in some other implementations the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 also may include a modem to modulate the packets, to provide the modulated packets to one or more antennas 1525 for transmission, and to demodulate packets received from the one or more antennas 1525.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some implementations, the code 1535 may not be directly executable by the processor 1540 but may cause a computer (for example, if compiled and executed) to perform functions described herein. In some implementations, the memory 1530 may contain, among other things, a BIOS which may control basic hardware or software operation such as the interaction with peripheral components or devices.

The inter-station communications manager 1545 may manage communications with other BSs 105, and may include a controller or scheduler for controlling communications with UEs 115 in cooperation with other BSs 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between BSs 105.

The processor 1540 may be any one or more suitable processors capable of executing scripts or instructions of one or more software programs stored in the device 1505 (such as within the memory 1530). In some implementations, the processor 1540 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505.

The processing system of the device 1505 may interface with other components of the device 1505, and may process information received from other components (such as inputs or signals) or output information to other components. For example, a chip or modem of the device 1505 may include a processing system, a first interface to output information, and a second interface to obtain information. In some implementations, the first interface may refer to an interface between the processing system of the chip or modem and a transmitter, such that the device 1505 may transmit information output from the chip or modem. In some implementations, the second interface may refer to an interface between the processing system of the chip or modem and a receiver, such that the device 1505 may obtain information or signal inputs, and the information may be passed to the processing system. A person having ordinary skill in the art will readily recognize that the first interface also may obtain information or signal inputs, and the second interface also may output information or signal outputs.

The communications manager 1520 may support wireless communication at an apparatus of a BS in accordance with examples as disclosed herein. For example, the communications manager 1520 may be configured as or otherwise support a means for outputting an indication of a set of linked PDCCH candidates, the set of linked PDCCH candidates including a first PDCCH candidate and a second PDCCH candidate that are associated with a same PDCCH information. The communications manager 1520 may be configured as or otherwise support a means for selecting the second PDCCH candidate as a monitored PDCCH candidate according to a resource conflict associated with the first PDCCH candidate. The communications manager 1520 may be configured as or otherwise support a means for selecting one of the first PDCCH candidate or the second PDCCH candidate as a reference for the set of linked PDCCH candidates in connection with selecting the second PDCCH candidate as the monitored PDCCH candidate. The communications manager 1520 may be configured as or otherwise support a means for outputting the PDCCH information over the second PDCCH candidate in accordance with the selected reference.

In some examples, the communications manager 1520 may be configured as or otherwise support a means for updating, in accordance with selecting the second PDCCH candidate as the monitored PDCCH candidate according to the resource conflict associated with the first PDCCH candidate, the set of linked PDCCH candidates to obtain an updated set of linked PDCCH candidates, where selecting one of the first PDCCH candidate or the second PDCCH candidate as the reference for the set of linked PDCCH candidates includes selecting the reference for the updated set of linked PDCCH candidates.

In some examples, to support updating the set of linked PDCCH candidates, the communications manager 1520 may be configured as or otherwise support a means for unlinking, from the set of linked PDCCH candidates, the first PDCCH candidate in accordance with the resource conflict associated with the first PDCCH candidate, where the updated set of linked PDCCH candidates excludes the first PDCCH candidate.

In some examples, to support updating the set of linked PDCCH candidates, the communications manager 1520 may be configured as or otherwise support a means for unlinking a first monitoring occasion associated with the first PDCCH candidate from a second monitoring occasion associated with the second PDCCH candidate in accordance with the resource conflict associated with the first PDCCH candidate, where the updated set of linked PDCCH candidates excludes the first PDCCH candidate.

In some examples, to support updating the set of linked PDCCH candidates, the communications manager 1520 may be configured as or otherwise support a means for unlinking a first number of PDCCH candidates associated with the first monitoring occasion and from a second number of PDCCH candidates associated with the second monitoring occasion.

In some examples, to support updating the set of linked PDCCH candidates, the communications manager 1520 may be configured as or otherwise support a means for unlinking a first SS set associated with the first PDCCH candidate from a second SS set associated with the second PDCCH candidate in accordance with the resource conflict associated with the first PDCCH candidate, where the updated set of linked PDCCH candidates excludes the first PDCCH candidate.

In some examples, to support updating the set of linked PDCCH candidates, the communications manager 1520 may be configured as or otherwise support a means for unlinking a first number of monitoring occasions associated with the first SS set from a second number of monitoring occasions associated with the second SS set.

In some examples, to support selecting the reference for the set of linked PDCCH candidates, the communications manager 1520 may be configured as or otherwise support a means for selecting the first PDCCH candidate or the second PDCCH candidate as the reference for the set of linked PDCCH candidates in accordance with a reference selection rule.

In some examples, the reference selection rule defines a procedure for selecting the reference from a set of PDCCH candidates including monitored PDCCH candidates and unmonitored PDCCH candidates of the set of linked PDCCH candidates.

In some examples, the communications manager 1520 may be configured as or otherwise support a means for communicating in accordance with the selected reference, where scheduling information associated with the communicating is a function of a time domain property or a frequency domain property of the selected reference.

In some examples, the resource conflict associated with the first PDCCH candidate is a result of a PDCCH candidate overbooking, a scheduling conflict, or a priority rule for PDCCH monitoring, or any combination thereof.

Additionally, or alternatively, the communications manager 1520 may support wireless communication at an apparatus of a BS in accordance with examples as disclosed herein. For example, the communications manager 1520 may be configured as or otherwise support a means for outputting an indication of a set of linked PDCCH candidates, the set of linked PDCCH candidates including multiple PDCCH candidates that are associated with a same PDCCH information. The communications manager 1520 may be configured as or otherwise support a means for selecting a first PDCCH candidate that is outside of the set of linked PDCCH candidates as a monitored PDCCH candidate in accordance with a resource conflict between the first PDCCH candidate and a second PDCCH candidate that is within the set of linked PDCCH candidates, where the first PDCCH candidate is selected as the monitored PDCCH candidate instead of an entirety of the set of linked PDCCH candidates.

In some examples, the communications manager 1520 may be configured as or otherwise support a means for selecting a first number of PDCCH candidates as monitored PDCCH candidates instead of a second number of PDCCH candidates allocated to a set of linked monitoring occasions that are associated with the set of linked PDCCH candidates in accordance with selecting the first PDCCH candidate as the monitored PDCCH candidate instead of the entirety of the set of linked PDCCH candidates, where each of the multiple PDCCH candidates of the set of linked PDCCH candidates corresponds to a monitoring occasion of the set of linked monitoring occasions.

In some examples, the communications manager 1520 may be configured as or otherwise support a means for selecting a first number of PDCCH candidates as monitored PDCCH candidates instead of a second number of PDCCH candidates allocated to a set of linked SS sets that are associated with the set of linked PDCCH candidates in accordance with selecting the first PDCCH candidate as the monitored PDCCH candidate instead of the entirety of the set of linked PDCCH candidates, where each of the multiple PDCCH candidates of the set of linked PDCCH candidates corresponds to an SS set of the set of linked SS sets.

In some examples, the resource conflict between the first PDCCH candidate and the second PDCCH candidate may be a result of a PDCCH candidate overbooking, a scheduling conflict, or a priority rule for PDCCH monitoring, or any combination thereof.

In some examples, the communications manager 1520 may be configured to perform various operations (such as receiving, monitoring, or transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of techniques for unlinking PDCCH candidates due to PDCCH candidate dropping in deployments featuring PDCCH repetition as described herein, or the processor 1540 and the memory 1530 may be otherwise configured to perform or support such operations.

Figure 16:
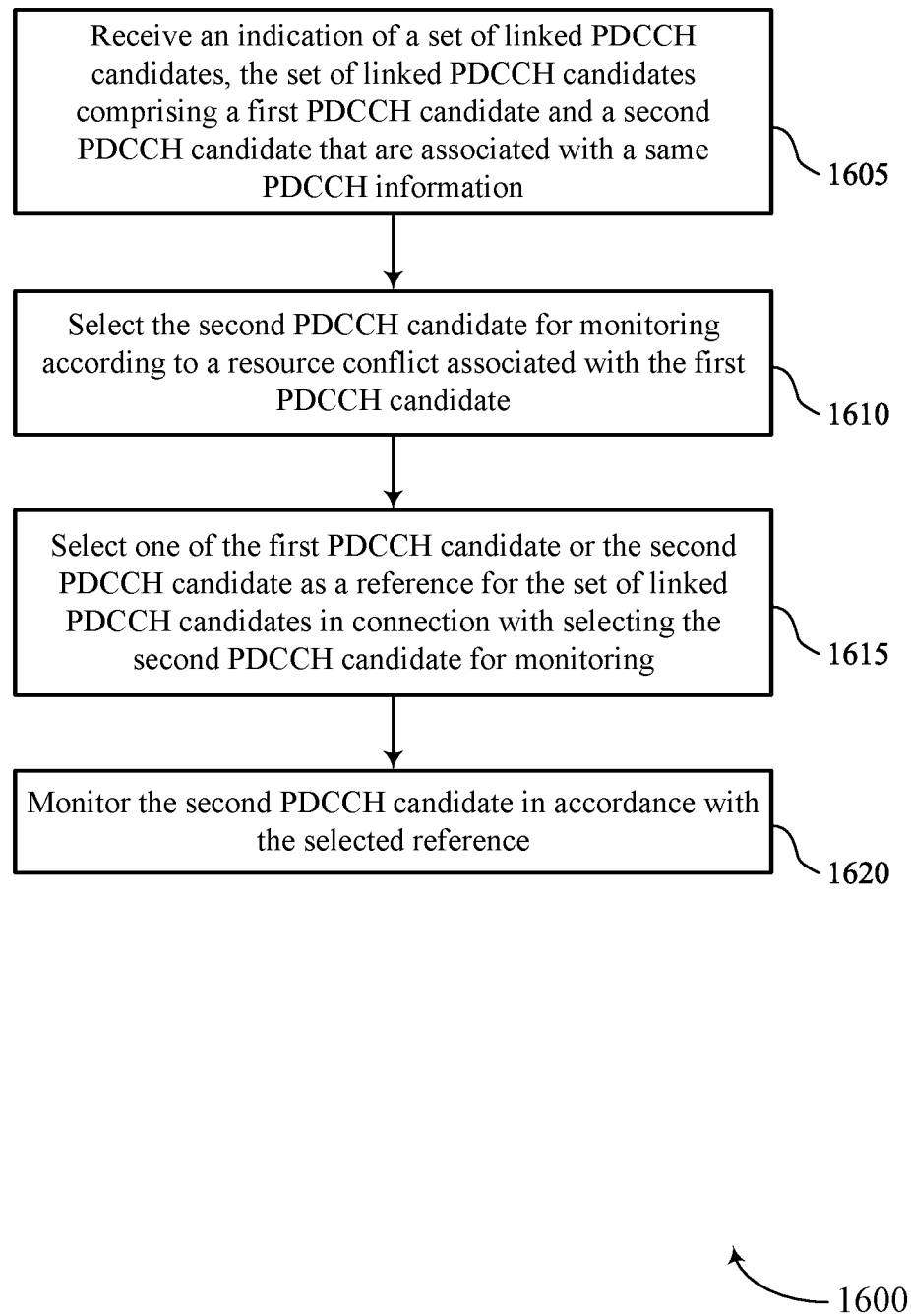
FIGS. 16-19 show flowcharts illustrating example methods that support techniques for unlinking PDCCH candidates due to PDCCH candidate dropping in deployments featuring PDCCH repetition.

FIG. 16 shows a flowchart illustrating a method 1600 that supports techniques for unlinking PDCCH candidates due to PDCCH candidate dropping in deployments featuring PDCCH repetition. The operations of the method 1600 may be implemented by a UE or its components as described herein. For example, the operations of the method 1600 may be performed by a UE 115 as described with reference to FIGS. 1-14. In some examples, a UE may execute a set of instructions to control the functional elements of the UE to perform the described functions. Additionally, or alternatively, the UE may perform aspects of the described functions using special-purpose hardware.

At 1605, the method may include receiving an indication of a set of linked PDCCH candidates, the set of linked PDCCH candidates including a first PDCCH candidate and a second PDCCH candidate that are associated with a same PDCCH information. The operations of 1605 may be performed in accordance with examples as disclosed herein.

At 1610, the method may include selecting the second PDCCH candidate for monitoring according to a resource conflict associated with the first PDCCH candidate. The operations of 1610 may be performed in accordance with examples as disclosed herein.

At 1615, the method may include selecting one of the first PDCCH candidate or the second PDCCH candidate as a reference for the set of linked PDCCH candidates in connection with selecting the second PDCCH candidate for monitoring. The operations of 1615 may be performed in accordance with examples as disclosed herein.

At 1620, the method may include monitoring the second PDCCH candidate in accordance with the selected reference. The operations of 1620 may be performed in accordance with examples as disclosed herein.

Figure 17:
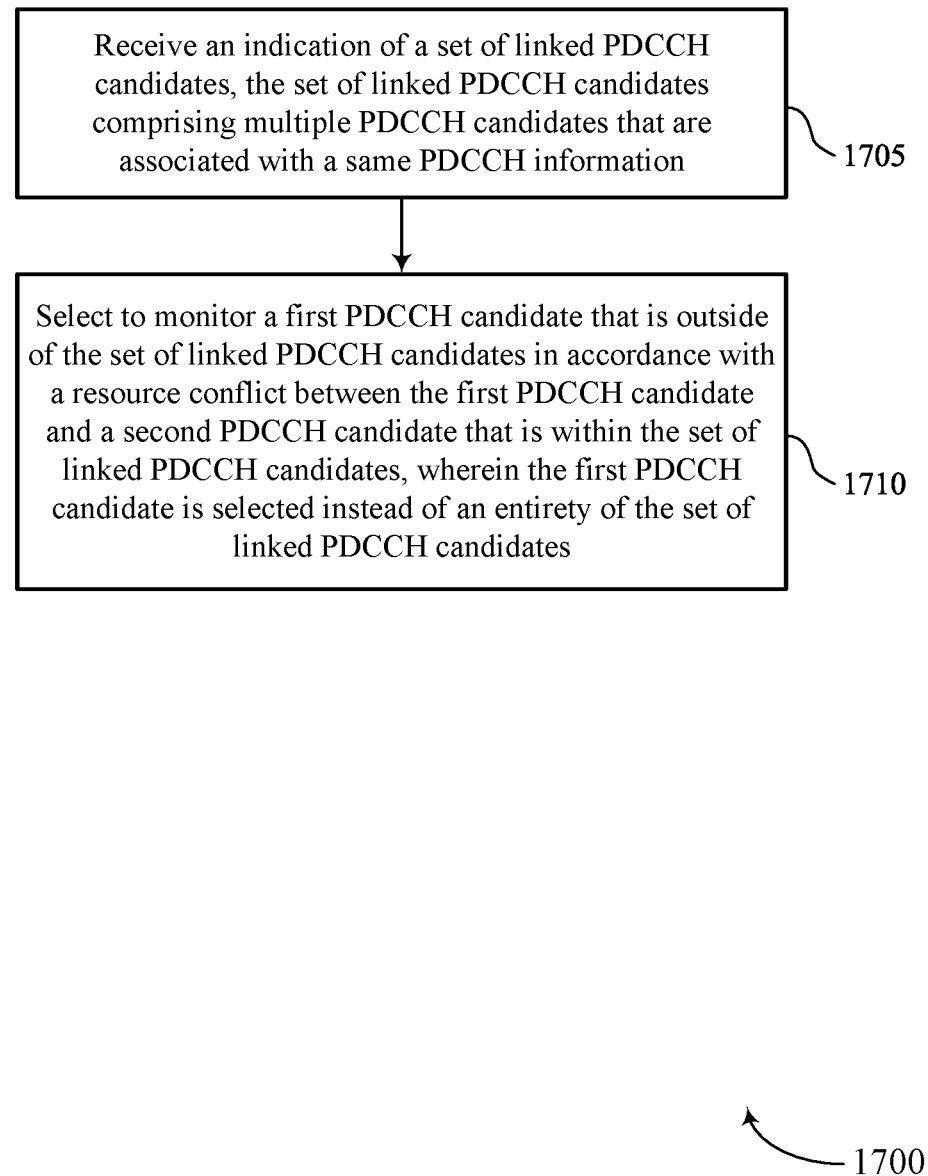

FIG. 17 shows a flowchart illustrating a method 1700 that supports techniques for unlinking PDCCH candidates due to PDCCH candidate dropping in deployments featuring PDCCH repetition. The operations of the method 1700 may be implemented by a UE or its components as described herein. For example, the operations of the method 1700 may be performed by a UE 115 as described with reference to FIGS. 1-14. In some examples, a UE may execute a set of instructions to control the functional elements of the UE to perform the described functions. Additionally, or alternatively, the UE may perform aspects of the described functions using special-purpose hardware.

At 1705, the method may include receiving an indication of a set of linked PDCCH candidates, the set of linked PDCCH candidates including multiple PDCCH candidates that are associated with a same PDCCH information. The operations of 1705 may be performed in accordance with examples as disclosed herein.

At 1710, the method may include selecting to monitor a first PDCCH candidate that is outside of the set of linked PDCCH candidates in accordance with a resource conflict between the first PDCCH candidate and a second PDCCH candidate that is within the set of linked PDCCH candidates, where the first PDCCH candidate is selected instead of an entirety of the set of linked PDCCH candidates. The operations of 1710 may be performed in accordance with examples as disclosed herein.

Figure 18:
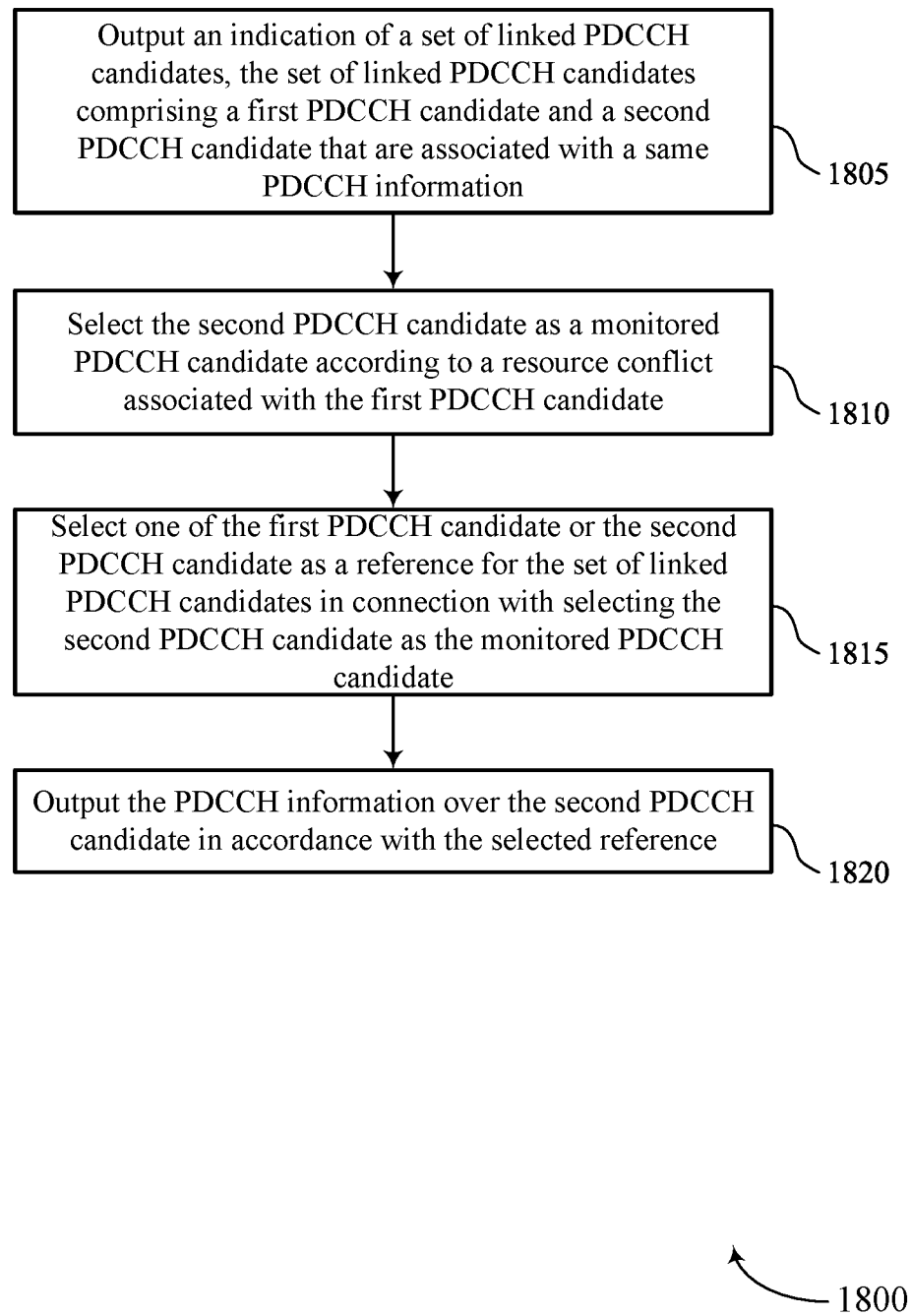

FIG. 18 shows a flowchart illustrating a method 1800 that supports techniques for unlinking PDCCH candidates due to PDCCH candidate dropping in deployments featuring PDCCH repetition. The operations of the method 1800 may be implemented by a BS or its components as described herein. For example, the operations of the method 1800 may be performed by a BS 105 as described with reference to FIGS. 1-13 and 15. In some examples, a BS may execute a set of instructions to control the functional elements of the BS to perform the described functions. Additionally, or alternatively, the BS may perform aspects of the described functions using special-purpose hardware.

At 1805, the method may include outputting an indication of a set of linked PDCCH candidates, the set of linked PDCCH candidates including a first PDCCH candidate and a second PDCCH candidate that are associated with a same PDCCH information. The operations of 1805 may be performed in accordance with examples as disclosed herein.

At 1810, the method may include selecting the second PDCCH candidate as a monitored PDCCH candidate according to a resource conflict associated with the first PDCCH candidate. The operations of 1810 may be performed in accordance with examples as disclosed herein.

At 1815, the method may include selecting one of the first PDCCH candidate or the second PDCCH candidate as a reference for the set of linked PDCCH candidates in connection with selecting the second PDCCH candidate as the monitored PDCCH candidate. The operations of 1815 may be performed in accordance with examples as disclosed herein.

At 1820, the method may include outputting the PDCCH information over the second PDCCH candidate in accordance with the selected reference. The operations of 1820 may be performed in accordance with examples as disclosed herein.

Figure 19:
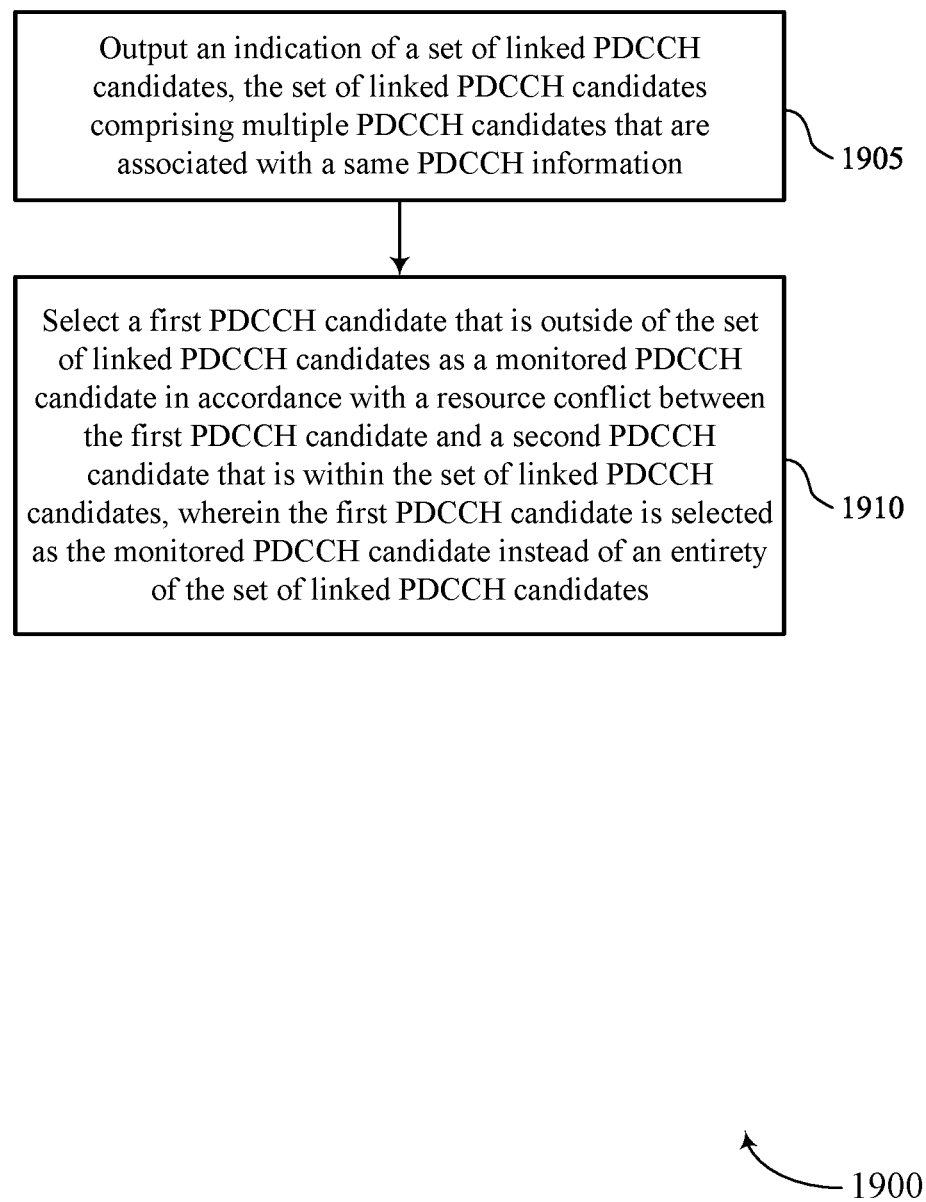

FIG. 19 shows a flowchart illustrating a method 1900 that supports techniques for unlinking PDCCH candidates due to PDCCH candidate dropping in deployments featuring PDCCH repetition. The operations of the method 1900 may be implemented by a BS or its components as described herein. For example, the operations of the method 1900 may be performed by a BS 105 as described with reference to FIGS. 1-13 and 15. In some examples, a BS may execute a set of instructions to control the functional elements of the BS to perform the described functions. Additionally, or alternatively, the BS may perform aspects of the described functions using special-purpose hardware.

At 1905, the method may include outputting an indication of a set of linked PDCCH candidates, the set of linked PDCCH candidates including multiple PDCCH candidates that are associated with a same PDCCH information. The operations of 1905 may be performed in accordance with examples as disclosed herein.

At 1910, the method may include selecting a first PDCCH candidate that is outside of the set of linked PDCCH candidates as a monitored PDCCH candidate in accordance with a resource conflict between the first PDCCH candidate and a second PDCCH candidate that is within the set of linked PDCCH candidates, where the first PDCCH candidate is selected as the monitored PDCCH candidate instead of an entirety of the set of linked PDCCH candidates. The operations of 1910 may be performed in accordance with examples as disclosed herein.

The following provides an overview of some aspects of the present disclosure:

Aspect 1: A method for wireless communication at a UE, including: receiving an indication of a set of linked PDCCH candidates, the set of linked PDCCH candidates including a first PDCCH candidate and a second PDCCH candidate that are associated with a same PDCCH information; selecting the second PDCCH candidate for monitoring according to a resource conflict associated with the first PDCCH candidate; selecting one of the first PDCCH candidate or the second PDCCH candidate as a reference for the set of linked PDCCH candidates in connection with selecting the second PDCCH candidate for monitoring; and monitoring the second PDCCH candidate in accordance with the selected reference.

Aspect 2: The method of aspect 1, further including: updating, in accordance with selecting the second PDCCH candidate for monitoring according to the resource conflict associated with the first PDCCH candidate, the set of linked PDCCH candidates to obtain an updated set of linked PDCCH candidates, where selecting one of the first PDCCH candidate or the second PDCCH candidate as the reference for the set of linked PDCCH candidates includes selecting the reference for the updated set of linked PDCCH candidates.

Aspect 3: The method of aspect 2, where updating the set of linked PDCCH candidates includes: unlinking, from the set of linked PDCCH candidates, the first PDCCH candidate in accordance with the resource conflict associated with the first PDCCH candidate, where the updated set of linked PDCCH candidates excludes the first PDCCH candidate.

Aspect 4: The method of any of aspects 2 or 3, where updating the set of linked PDCCH candidates includes: unlinking a first monitoring occasion associated with the first PDCCH candidate from a second monitoring occasion associated with the second PDCCH candidate in accordance with the resource conflict associated with the first PDCCH candidate, where the updated set of linked PDCCH candidates excludes the first PDCCH candidate.

Aspect 5: The method of aspect 4, where updating the set of linked PDCCH candidates further includes: unlinking a first number of PDCCH candidates associated with the first monitoring occasion and from a second number of PDCCH candidates associated with the second monitoring occasion.

Aspect 6: The method of any of aspects 2-5, where updating the set of linked PDCCH candidates includes: unlinking a first SS set associated with the first PDCCH candidate from a second SS set associated with the second PDCCH candidate in accordance with the resource conflict associated with the first PDCCH candidate, where the updated set of linked PDCCH candidates excludes the first PDCCH candidate.

Aspect 7: The method of aspect 6, where updating the set of linked PDCCH candidates further includes: unlinking a first number of monitoring occasions associated with the first SS set from a second number of monitoring occasions associated with the second SS set.

Aspect 8: The method of any of aspects 1-7, where selecting one of the first PDCCH candidate or the second PDCCH candidate as the reference for the set of linked PDCCH candidates includes: selecting the first PDCCH candidate or the second PDCCH candidate as the reference for the set of linked PDCCH candidates in accordance with a reference selection rule.

Aspect 9: The method of aspect 8, where the reference selection rule defines a procedure for selecting the reference from a set of PDCCH candidates including monitored PDCCH candidates and unmonitored PDCCH candidates of the set of linked PDCCH candidates.

Aspect 10: The method of any of aspects 1-9, further including: communicating with a component of a base station in accordance with the selected reference, where scheduling information associated with the communicating with the component of the base station is a function of a time domain property or a frequency domain property of the selected reference.

Aspect 11: The method of any of aspects 1-10, where the resource conflict associated with the first PDCCH candidate is a result of a PDCCH candidate overbooking, a scheduling conflict, or a priority rule for PDCCH monitoring, or any combination thereof.

Aspect 12: A method for wireless communication at a UE, including: receiving an indication of a set of linked PDCCH candidates, the set of linked PDCCH candidates including multiple PDCCH candidates that are associated with a same PDCCH information; and selecting to monitor a first PDCCH candidate that is outside of the set of linked PDCCH candidates in accordance with a resource conflict between the first PDCCH candidate and a second PDCCH candidate that is within the set of linked PDCCH candidates, where the first PDCCH candidate is selected instead of an entirety of the set of linked PDCCH candidates.

Aspect 13: The method of aspect 12, further including: refraining from monitoring for a number of PDCCH candidates over a set of linked monitoring occasions that are associated with the set of linked PDCCH candidates in accordance with selecting to monitor the first PDCCH candidate instead of the entirety of the set of linked PDCCH candidates, where each of the multiple PDCCH candidates of the set of linked PDCCH candidates corresponds to a monitoring occasion of the set of linked monitoring occasions.

Aspect 14: The method of any of aspects 12 or 13, further including: refraining from monitoring for a number of PDCCH candidates over a set of linked SS sets that are associated with the set of linked PDCCH candidates in accordance with selecting to monitor the first PDCCH candidate instead of the entirety of the set of linked PDCCH candidates, where each of the multiple PDCCH candidates of the set of linked PDCCH candidates corresponds to an SS set of the set of linked SS sets.

Aspect 15: The method of any of aspects 12-14, where the resource conflict between the first PDCCH candidate and the second PDCCH candidate is a result of a PDCCH candidate overbooking, a scheduling conflict, or a priority rule for PDCCH monitoring, or any combination thereof.

Aspect 16: A method for wireless communication at an apparatus of a BS, including: outputting an indication of a set of linked PDCCH candidates, the set of linked PDCCH candidates including a first PDCCH candidate and a second PDCCH candidate that are associated with a same PDCCH information; selecting the second PDCCH candidate as a monitored PDCCH candidate according to a resource conflict associated with the first PDCCH candidate; selecting one of the first PDCCH candidate or the second PDCCH candidate as a reference for the set of linked PDCCH candidates in connection with selecting the second PDCCH candidate as the monitored PDCCH candidate; and outputting the PDCCH information over the second PDCCH candidate in accordance with the selected reference.

Aspect 17: The method of aspect 16, further including: updating, in accordance with selecting the second PDCCH candidate as the monitored PDCCH candidate according to the resource conflict associated with the first PDCCH candidate, the set of linked PDCCH candidates to obtain an updated set of linked PDCCH candidates, where selecting one of the first PDCCH candidate or the second PDCCH candidate as the reference for the set of linked PDCCH candidates includes selecting the reference for the updated set of linked PDCCH candidates.

Aspect 18: The method of aspect 17, where updating the set of linked PDCCH candidates includes: unlinking, from the set of linked PDCCH candidates, the first PDCCH candidate in accordance with the resource conflict associated with the first PDCCH candidate, where the updated set of linked PDCCH candidates excludes the first PDCCH candidate.

Aspect 19: The method of any of aspects 17 or 18, where updating the set of linked PDCCH candidates includes: unlinking a first monitoring occasion associated with the first PDCCH candidate from a second monitoring occasion associated with the second PDCCH candidate in accordance with the resource conflict associated with the first PDCCH candidate, where the updated set of linked PDCCH candidates excludes the first PDCCH candidate.

Aspect 20: The method of aspect 19, where updating the set of linked PDCCH candidates further includes: unlinking a first number of PDCCH candidates associated with the first monitoring occasion and from a second number of PDCCH candidates associated with the second monitoring occasion.

Aspect 21: The method of any of aspects 17-20, where updating the set of linked PDCCH candidates includes: unlinking a first SS set associated with the first PDCCH candidate from a second SS set associated with the second PDCCH candidate in accordance with the resource conflict associated with the first PDCCH candidate, where the updated set of linked PDCCH candidates excludes the first PDCCH candidate.

Aspect 22: The method of aspect 21, where updating the set of linked PDCCH candidates further includes: unlinking a first number of monitoring occasions associated with the first SS set from a second number of monitoring occasions associated with the second SS set.

Aspect 23: The method of any of aspects 16-22, where selecting the reference for the set of linked PDCCH candidates includes: selecting the first PDCCH candidate or the second PDCCH candidate as the reference for the set of linked PDCCH candidates in accordance with a reference selection rule.

Aspect 24: The method of aspect 23, where the reference selection rule defines a procedure for selecting the reference from a set of PDCCH candidates including monitored PDCCH candidates and unmonitored PDCCH candidates of the set of linked PDCCH candidates.

Aspect 25: The method of any of aspects 16-24, further including: communicating in accordance with the selected reference, where scheduling information associated with the communicating is a function of a time domain property or a frequency domain property of the selected reference.

Aspect 26: The method of any of aspects 16-25, where the resource conflict associated with the first PDCCH candidate is a result of a PDCCH candidate overbooking, a scheduling conflict, or a priority rule for PDCCH monitoring, or any combination thereof.

Aspect 27: A method for wireless communication at an apparatus of a BS, including: outputting an indication of a set of linked PDCCH candidates, the set of linked PDCCH candidates including multiple PDCCH candidates that are associated with a same PDCCH information; and selecting a first PDCCH candidate that is outside of the set of linked PDCCH candidates as a monitored PDCCH candidate in accordance with a resource conflict between the first PDCCH candidate and a second PDCCH candidate that is within the set of linked PDCCH candidates, where the first PDCCH candidate is selected as the monitored PDCCH candidate instead of an entirety of the set of linked PDCCH candidates.

Aspect 28: The method of aspect 27, further including: selecting a first number of PDCCH candidates as monitored PDCCH candidates instead of a second number of PDCCH candidates allocated to a set of linked monitoring occasions that are associated with the set of linked PDCCH candidates in accordance with selecting the first PDCCH candidate as the monitored PDCCH candidate instead of the entirety of the set of linked PDCCH candidates, where each of the multiple PDCCH candidates of the set of linked PDCCH candidates corresponds to a monitoring occasion of the set of linked monitoring occasions.

Aspect 29: The method of any of aspects 27 or 28, further including: selecting a first number of PDCCH candidates as monitored PDCCH candidates instead of a second number of PDCCH candidates allocated to a set of linked SS sets that are associated with the set of linked PDCCH candidates in accordance with selecting the first PDCCH candidate as the monitored PDCCH candidate instead of the entirety of the set of linked PDCCH candidates, where each of the multiple PDCCH candidates of the set of linked PDCCH candidates corresponds to an SS set of the set of linked SS sets.

Aspect 30: The method of any of aspects 27-29, where the resource conflict between the first PDCCH candidate and the second PDCCH candidate is a result of a PDCCH candidate overbooking, a scheduling conflict, or a priority rule for PDCCH monitoring, or any combination thereof.

Aspect 31: An apparatus for wireless communication at a UE, including at least a first interface, a processing system, and a second interface configured to cause the apparatus to perform a method of any of aspects 1-11.

Aspect 32: An apparatus for wireless communication at a UE, including a processor; memory coupled with the processor; and instructions stored in the memory and executable by the processor to cause the apparatus to perform a method of any of aspects 1-11.

Aspect 33: An apparatus for wireless communication at a UE, including at least one means for performing a method of any of aspects 1-11.

Aspect 34: A non-transitory computer-readable medium storing code for wireless communication at a UE, the code including instructions executable by a processor to perform a method of any of aspects 1-11.

Aspect 35: An apparatus for wireless communication at a UE, including at least a first interface, a processing system, and a second interface configured to cause the apparatus to perform a method of any of aspects 12-15.

Aspect 36: An apparatus for wireless communication at a UE, including a processor; memory coupled with the processor; and instructions stored in the memory and executable by the processor to cause the apparatus to perform a method of any of aspects 12-15.

Aspect 37: An apparatus for wireless communication at a UE, including at least one means for performing a method of any of aspects 12-15.

Aspect 38: A non-transitory computer-readable medium storing code for wireless communication at a UE, the code including instructions executable by a processor to perform a method of any of aspects 12-15.

Aspect 39: An apparatus for wireless communication at a UE, including at least a first interface, a processing system, and a second interface configured to cause the apparatus to perform a method of any of aspects 16-26.

Aspect 40: An apparatus for wireless communication at an apparatus of a BS, including a processor; memory coupled with the processor; and instructions stored in the memory and executable by the processor to cause the apparatus to perform a method of any of aspects 16-26.

Aspect 41: An apparatus for wireless communication at an apparatus of a BS, including at least one means for performing a method of any of aspects 16-26.

Aspect 42: A non-transitory computer-readable medium storing code for wireless communication at an apparatus of a BS, the code including instructions executable by a processor to perform a method of any of aspects 16-26.

Aspect 43: An apparatus for wireless communication at a UE, including at least a first interface, a processing system, and a second interface configured to cause the apparatus to perform a method of any of aspects 27-30.

Aspect 44: An apparatus for wireless communication at an apparatus of a BS, including a processor; memory coupled with the processor; and instructions stored in the memory and executable by the processor to cause the apparatus to perform a method of any of aspects 27-30.

Aspect 45: An apparatus for wireless communication at an apparatus of a BS, including at least one means for performing a method of any of aspects 27-30.

Aspect 46: A non-transitory computer-readable medium storing code for wireless communication at an apparatus of a BS, the code including instructions executable by a processor to perform a method of any of aspects 27-30.

As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it may be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communications at a user equipment (UE), comprising:
a first interface configured to:
obtain an indication of a set of linked physical downlink control channel (PDCCH) candidates, the set of linked PDCCH candidates comprising a first PDCCH candidate and a second PDCCH candidate that are associated with a same PDCCH information; and
one or more processing systems configured to:
select the second PDCCH candidate for monitoring according to a resource overlap associated with the first PDCCH candidate; and
select one of the first PDCCH candidate or the second PDCCH candidate as a reference for the set of linked PDCCH candidates in connection with selecting the second PDCCH candidate for monitoring, wherein selecting one of the first PDCCH candidate or the second PDCCH candidate as the reference for the set of linked PDCCH candidates comprises selecting the reference for the set of linked PDCCH candidates in accordance with a reference selection rule that defines a procedure for selecting the reference from a set of PDCCH candidates including monitored PDCCH candidates and unmonitored PDCCH candidates of the set of linked PDCCH candidates.

2. The apparatus of claim 1, wherein the first interface is further configured to monitor the second PDCCH candidate in accordance with the selected reference.

3. The apparatus of claim 1, wherein the one or more processing systems are further configured to update, in accordance with selecting the second PDCCH candidate for monitoring according to the resource overlap associated with the first PDCCH candidate, the set of linked PDCCH candidates to obtain an updated set of linked PDCCH candidates.

4. The apparatus of claim 3, wherein updating the set of linked PDCCH candidates further comprises unlinking, from the set of linked PDCCH candidates, the first PDCCH candidate in accordance with the resource overlap associated with the first PDCCH candidate, wherein the updated set of linked PDCCH candidates excludes the first PDCCH candidate.

5. The apparatus of claim 3, wherein updating the set of linked PDCCH candidates further comprises unlinking a first monitoring occasion associated with the first PDCCH candidate from a second monitoring occasion associated with the second PDCCH candidate in accordance with the resource overlap associated with the first PDCCH candidate, wherein the updated set of linked PDCCH candidates excludes the first PDCCH candidate.

6. The apparatus of claim 5, wherein updating the set of linked PDCCH candidates further comprises unlinking a first number of PDCCH candidates associated with the first monitoring occasion and from a second number of PDCCH candidates associated with the second monitoring occasion.

7. The apparatus of claim 3, wherein updating the set of linked PDCCH candidates further comprises unlinking a first search space (SS) set associated with the first PDCCH candidate from a second SS set associated with the second PDCCH candidate in accordance with the resource overlap associated with the first PDCCH candidate, wherein the updated set of linked PDCCH candidates excludes the first PDCCH candidate.

8. The apparatus of claim 7, wherein updating the set of linked PDCCH candidates further comprises unlinking a first number of monitoring occasions associated with the first SS set from a second number of monitoring occasions associated with the second SS set.

9. The apparatus of claim 1, wherein the first interface or a second interface is configured to communicate with a component of a network entity in accordance with the selected reference, wherein scheduling information associated with the communicating with the component of the network entity is a function of a time domain property or a frequency domain property of the selected reference.

10. The apparatus of claim 1, wherein the resource overlap associated with the first PDCCH candidate is a result of a PDCCH candidate overbooking, a scheduling conflict, or a priority rule for PDCCH monitoring, or any combination thereof.

11. An apparatus for wireless communication at a network entity, comprising:
 a first interface configured to:
  output an indication of a set of linked physical downlink control channel (PDCCH) candidates, the set of linked PDCCH candidates comprising a first PDCCH candidate and a second PDCCH candidate that are associated with a same PDCCH information; and
 one or more processing systems configured to:
  select the second PDCCH candidate as a monitored PDCCH candidate according to a resource overlap associated with the first PDCCH candidate; and
  select one of the first PDCCH candidate or the second PDCCH candidate as a reference for the set of linked PDCCH candidates in connection with selecting the second PDCCH candidate as the monitored PDCCH candidate, wherein selecting one of the first PDCCH candidate or the second PDCCH candidate as the reference for the set of linked PDCCH candidates comprises selecting the reference for the set of linked PDCCH candidates in accordance with a reference selection rule that defines a procedure for selecting the reference from a set of PDCCH candidates including monitored PDCCH candidates and unmonitored PDCCH candidates of the set of linked PDCCH candidates.

12. The apparatus of claim 11, wherein the first interface or a second interface is configured to output the PDCCH information over the second PDCCH candidate in accordance with the selected reference.

13. The apparatus of claim 11, wherein the one or more processing systems are further configured to update, in accordance with selecting the second PDCCH candidate as the monitored PDCCH candidate according to the resource overlap associated with the first PDCCH candidate, the set of linked PDCCH candidates to obtain an updated set of linked PDCCH candidates.

14. The apparatus of claim 13, wherein updating the set of linked PDCCH candidates further comprises unlinking, from the set of linked PDCCH candidates, the first PDCCH candidate in accordance with the resource overlap associated with the first PDCCH candidate, wherein the updated set of linked PDCCH candidates excludes the first PDCCH candidate.

15. The apparatus of claim 13, wherein updating the set of linked PDCCH candidates further comprises at least one of:
 unlinking a first monitoring occasion associated with the first PDCCH candidate from a second monitoring occasion associated with the second PDCCH candidate in accordance with the resource overlap associated with the first PDCCH candidate, wherein the updated set of linked PDCCH candidates excludes the first PDCCH candidate; or unlinking a first number of PDCCH candidates associated with the first monitoring occasion and from a second number of PDCCH candidates associated with the second monitoring occasion.

16. The apparatus of claim 13, wherein updating the set of linked PDCCH candidates further comprises at least one of:
 unlinking a first search space (SS) set associated with the first PDCCH candidate from a second SS set associated with the second PDCCH candidate in accordance with the resource overlap associated with the first PDCCH candidate, wherein the updated set of linked PDCCH candidates excludes the first PDCCH candidate; or unlinking a first number of monitoring occasions associated with the first SS set from a second number of monitoring occasions associated with the second SS set.

17. A method for wireless communication at a user equipment (UE), comprising:
 receiving an indication of a set of linked physical downlink control channel (PDCCH) candidates, the set of linked PDCCH candidates comprising a first PDCCH candidate and a second PDCCH candidate that are associated with a same PDCCH information;
 selecting the second PDCCH candidate for monitoring according to a resource overlap associated with the first PDCCH candidate; and
 selecting one of the first PDCCH candidate or the second PDCCH candidate as a reference for the set of linked PDCCH candidates in connection with selecting the second PDCCH candidate for monitoring, wherein selecting one of the first PDCCH candidate or the second PDCCH candidate as the reference for the set of linked PDCCH candidates comprises selecting the reference for the set of linked PDCCH candidates in accordance with a reference selection rule that defines a procedure for selecting the reference from a set of PDCCH candidates including monitored PDCCH candidates and unmonitored PDCCH candidates of the set of linked PDCCH candidates.

18. The method of claim 17, wherein selecting one of the first PDCCH candidate or the second PDCCH candidate as the reference for the set of linked PDCCH candidates further comprises selecting the first PDCCH candidate or the second PDCCH candidate as the reference for the set of linked PDCCH candidates in accordance with a reference selection rule that defines a procedure for selecting the reference from a set of PDCCH candidates including monitored PDCCH candidates and unmonitored PDCCH candidates of the set of linked PDCCH candidates.

* * * * *